United States Patent
Hughes

(10) Patent No.: US 11,928,033 B2
(45) Date of Patent: *Mar. 12, 2024

(54) INCIDENT-RESPONSIVE, COMPUTING SYSTEM SNAPSHOT GENERATION

(71) Applicant: Ivanti, Inc., South Jordan, UT (US)

(72) Inventor: Liam Hughes, Sychdyn (GB)

(73) Assignee: Ivanti, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,628

(22) Filed: Jun. 29, 2022

(65) Prior Publication Data

US 2022/0327031 A1    Oct. 13, 2022

Related U.S. Application Data

(63) Continuation of application No. 17/220,908, filed on Apr. 1, 2021, now Pat. No. 11,416,348.

(Continued)

(51) Int. Cl.
| | |
|---|---|
| *G06F 11/00* | (2006.01) |
| *G06F 11/14* | (2006.01) |
| *G06F 11/34* | (2006.01) |

(52) U.S. Cl.
CPC ...... *G06F 11/1464* (2013.01); *G06F 11/3495* (2013.01); *G06F 2201/84* (2013.01)

(58) Field of Classification Search
CPC .. G06F 21/566; G06F 21/567; G06F 11/0766; G06F 11/0769; G06F 11/0775; G06F 11/0778; G06F 11/0781; G06F 11/079; G06F 11/0793; G06F 11/302; G06F 11/3089; G06F 11/36; G06F 11/3612; G06F 11/362; G06F 11/3466;
(Continued)

(56) References Cited

U.S. PATENT DOCUMENTS 7,171,586 B1 * 1/2007 Gross .................. G06F 11/3414
714/E11.2
2016/0224910 A1    8/2016 Deng et al.
(Continued)

OTHER PUBLICATIONS

Communication pursuant to Rules 161(1) and 162 EPC for European Patent Application No. 21721720.7-1224, dated Oct. 18, 2022, 3 pages.

(Continued)

*Primary Examiner* — Michael Maskulinski

(57) ABSTRACT

A method of remote device diagnosis and mitigation includes receiving a signal indicative of an intermittent technical state of a first device. Immediately responsive thereto, the method includes interrogating the first device for parameters. The method includes interrogating the first device for the parameters at a third time outside receipt of the signal. The parameters include a transient parameter present at a first time of the intermittent technical state and not present a second time following the first time. The method includes recording the parameters from the first time in a first data file and the parameters for the third time in an additional data file. The first data file is compared with the additional data file to identify a difference in a parameter indicative of a cause of the intermittent technical state. The method includes remotely implementing a change on the first device to mitigate the cause.

18 Claims, 17 Drawing Sheets

Related U.S. Application Data

(60) Provisional application No. 63/004,755, filed on Apr. 3, 2020.

(58) Field of Classification Search
CPC ...... G05B 2219/24042; G05B 23/0205; G05B 23/0259; G05B 23/027; G05B 19/0425; G05B 19/058
See application file for complete search history.

(56) References Cited

U.S. PATENT DOCUMENTS

| | | | |
|---|---|---|---|
| 2017/0075738 A1* | 3/2017 | Han | G06Q 10/06 |
| 2018/0173612 A1* | 6/2018 | Law | G06F 11/3636 |
| 2019/0230112 A1 | 7/2019 | Gandham et al. | |

OTHER PUBLICATIONS

International Preliminary Report on Patentability and Written Opinion for Application No. PCT/US2021/025680, dated Sep. 29, 2022, 10 pages.

* cited by examiner

```
                    index bbb/328..bf08458 100644                                    500
                    --- a/deployment/live/azure-piplines.yml
                    +++ b/deployment/live/azure-piplines.yml
                    @@ -18,21 +18,20 @@ stages:
18  18  -           stage: Promote
19  19              displayName: Promote Staging to live
20  20              jobs:
┌─────────────────────────────────────────────────────────────────────────────┐
│21      -         - job: PromoteJob                                           │
│22      -           displayName: Promote Function from Dev to Live            │
│23      -           pool:                                                     │
│24      -             name: $(poolName)                                       │
│25      -           steps:                                                    │
│26      -           - script: curl -sl https://aka.ms/InstallAzureCLIDeb | sudo bash │
│27      -             displayName: 'Apdate az'                            502 │
└─────────────────────────────────────────────────────────────────────────────┘
┌─────────────────────────────────────────────────────────────────────────────┐
│    21  +         - job: PromoteJob                                           │
│    22  +           displayName: Promote Function from Dev to Live            │
│    23  +           pool:                                                     │
│    24  +             name: $(poolName)                                       │
│    25  +           steps:                                                    │
│    26  +           - script: curl -sl https://aka.ms/InstallAzureCLIDeb | sudo bash │
│    27  +             displayName: 'Apdate az'                            504 │
└─────────────────────────────────────────────────────────────────────────────┘
28  28
┌─────────────────────────────────────────────────────────────────────────────┐
│29      -           - task: AzureCLI@2                                    506 │
│30      -             displayName: Swap dev function to production            │
│31      -             inputs:                                                 │
│32      -               azureSubscription: '$(vstsResourceName)'              │
│33      -               scriptType: 'bash'                                    │
│34      -               scriptLocation: 'inlineScript'                        │
│35      -               inlineScript: 'as functionapp deployment slot swap ... - slot staging' │
└─────────────────────────────────────────────────────────────────────────────┘
┌─────────────────────────────────────────────────────────────────────────────┐
│    29  +           - task: AzureCLI@2                                    508 │
│    30  +             displayName: Swap dev function to production            │
│    31  +             inputs:                                                 │
│    32  +               azureSubscription: '$(vstsResourceName)'              │
│    33  +               scriptType: 'bash'                                    │
│    34  +               scriptLocation: 'inlineScript'                        │
│    35  +               inlineScript: 'as functionapp deployment slot swap ... - slot staging' │
└─────────────────────────────────────────────────────────────────────────────┘
36  36
37      -           - script: ''
38      -             displayName: 'Merge git branches and tag'
    37  +           - script: ''
```

FIG. 5

INCIDENT-RESPONSIVE, COMPUTING SYSTEM SNAPSHOT GENERATION

CROSS-REFERENCE TO RELATED APPLICATIONS

This application claims the benefit of and priority to U.S. patent application Ser. No. 17/220,908, filed Apr. 1, 2021, which claims priority to U.S. Provisional Application No. 63/004,755, filed Apr. 3, 2020. This application incorporates the disclosures of these applications by reference in their entireties.

FIELD

The embodiments discussed in this disclosure are related to information technology service management (ITSM) and incident management systems, and in particular to systems and methods of incident-responsive, computing system snapshot generation.

BACKGROUND

Some networks of devices are supported by information technology service management (ITSM) systems. The ITSM system is implemented to deploy one or more network support services such as tracking computing assets and devices, automating changes to the computing assets, and incident management services, among others. The incident management services of the ITSM system are sometimes comprised of one or more incident management devices, IT analyst devices, and one or more IT support providers. The incident management devices manage incident and helpdesk operations such as support ticket generation, support ticket receipt, support ticket assignment, metric measurement and aggregation, and the like. The IT support providers interface with the incident management devices to perform operations to diagnose, correct or mitigate incidents or technical issues experienced at user devices.

In some conventional ITSM systems, one or more users and the user devices may be remotely coupled to the IT support providers. In response to one of the users experiencing a technical issue with a user device, the user may submit a support ticket. For instance, the user may select an icon. Selection of the icon may automatically trigger a support ticket, or the user may interface with a browser supported website that allows entry of information. The support ticket may then be populated with information related to the technical issue. For instance, the user may enter some of the information manually or select one or more predefined issues from dropdown menus. The support ticket is then communicated to the IT support provider and/or incident management devices.

In these and other systems, between submission of the support ticket and the IT support provider addressing the support ticket, the state of the user device may change. These changes may result from actions of the user or a transient operation or condition of the user device. The changes to the user device may mask or conceal parameters of the user device that may be important in determining the cause of the technical issue. The IT support provider may accordingly diagnose a cause of the technical issue with incomplete and unreliable information. For instance, in conventional ITSM systems, the IT support provider may rely on the information in the support ticket, information gained through remotely accessing the user device after the fact, some screenshots, and perhaps a conversation with the user. Accordingly, a need exists in the field of ITSM systems and related network support services for systems and methods of remote computing device diagnosis based on incident-responsive, computing system snapshot generation.

The subject matter claimed herein is not limited to embodiments that solve any disadvantages or that operate only in environments such as those described. Rather, this background is only provided to illustrate one example technology area where some embodiments described herein may be practiced.

SUMMARY

The embodiments discussed in this disclosure are related to information technology service management (ITSM) and incident management systems, and in particular to systems and methods of incident-responsive, computing system snapshot generation.

An aspect of an embodiment of the invention may include a method of remote computing device diagnosis and mitigation. The method may include receiving a signal indicative of an intermittent technical state of a first computing device. The signal indicative of the intermittent technical state may be triggered responsive to a selection of an icon by a user on the first computing device by a user or may be triggered responsive to a specific event on the first computing device. Immediately responsive to the signal, the method may include interrogating the first computing device for computing parameters related to the intermittent technical state. The computing parameters may include at least one transient parameter that is present at a first time at which the intermittent technical state exists on the first computing device and not present a second time following the first time. The interrogating the first computing device may include communicating a message queuing telemetry transport (MQTT) message to the the first computing device. Additionally or alternatively, the interrogating the first computing device may be implemented through execution of one or more real time sensors that include a set of non-transitory computing instructions stored locally at the first computing device. In some circumstances, the interrogating the at least one computing device may be performed according to a particular schedule such as once a month. The method may include recording the plurality of computing parameters in a first data file. The method may include further interrogating the first computing device for the plurality of computing parameters at a third time outside receipt of the signal. The method may include further recording the plurality of computing parameters for the third times in an additional data file. The method may include comparing the first data file with the additional data file. Based on the comparison, the method may include identifying a difference in at least one parameter of the computer parameters between the first data file and the additional data file. The difference may be indicative of a cause of the intermittent technical state. The method may include remotely implementing at least one change on the first computing device to mitigate the cause of the intermittent technical state. In some circumstances, the method may include receiving with the signal, a message describing the intermittent technical state in a network service system. The first data file may be linked to the message and message may be communicated to a second device along with the first data file. The method may also include further interrogating a third computing device for the computing parameters. The third computing device may be similarly configured to the first computing device. The method may include recording the computing parameters of the third computing device in a second additional data file. The method may include comparing the first data file with the second additional data file of the third computing device. The method may include identifying a second difference in at least one parameter based on the comparison between the first data file and the second additional data file. The second difference being related to the cause of the intermittent technical state. The first data file may be formatted according to a human-readable data-serialization language and/or a flat file format such as YAML or JSON. The parameters may include a current central processing unit (CPU) use, a process currently running on the first computing device, a service loaded on the first computing device, current memory use, current network traffic or some combination thereof. The first data file and the additional data file may be stored using a distributed version control system such as a GIT or another suitable control system.

Another aspect of an embodiment includes a non-transitory computer-readable medium having encoded therein programming code executable by one or more processors to perform or control performance of any combination of the operations of the methods of secured, remote device access through dynamic scope adjustment described above.

Yet another aspect of an embodiment includes an incident management system comprising one or more processors and a non-transitory computer-readable medium having encoded therein programming code executable by one or more processors to perform or control performance of any combination of the operations of the methods of secured, remote device access through dynamic scope adjustment described above.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 5 is a section of an example comparison file that may be implemented in the transient processes of FIGS. 3A and 3B;

DESCRIPTION OF SOME EXAMPLE EMBODIMENTS

Figure 1:
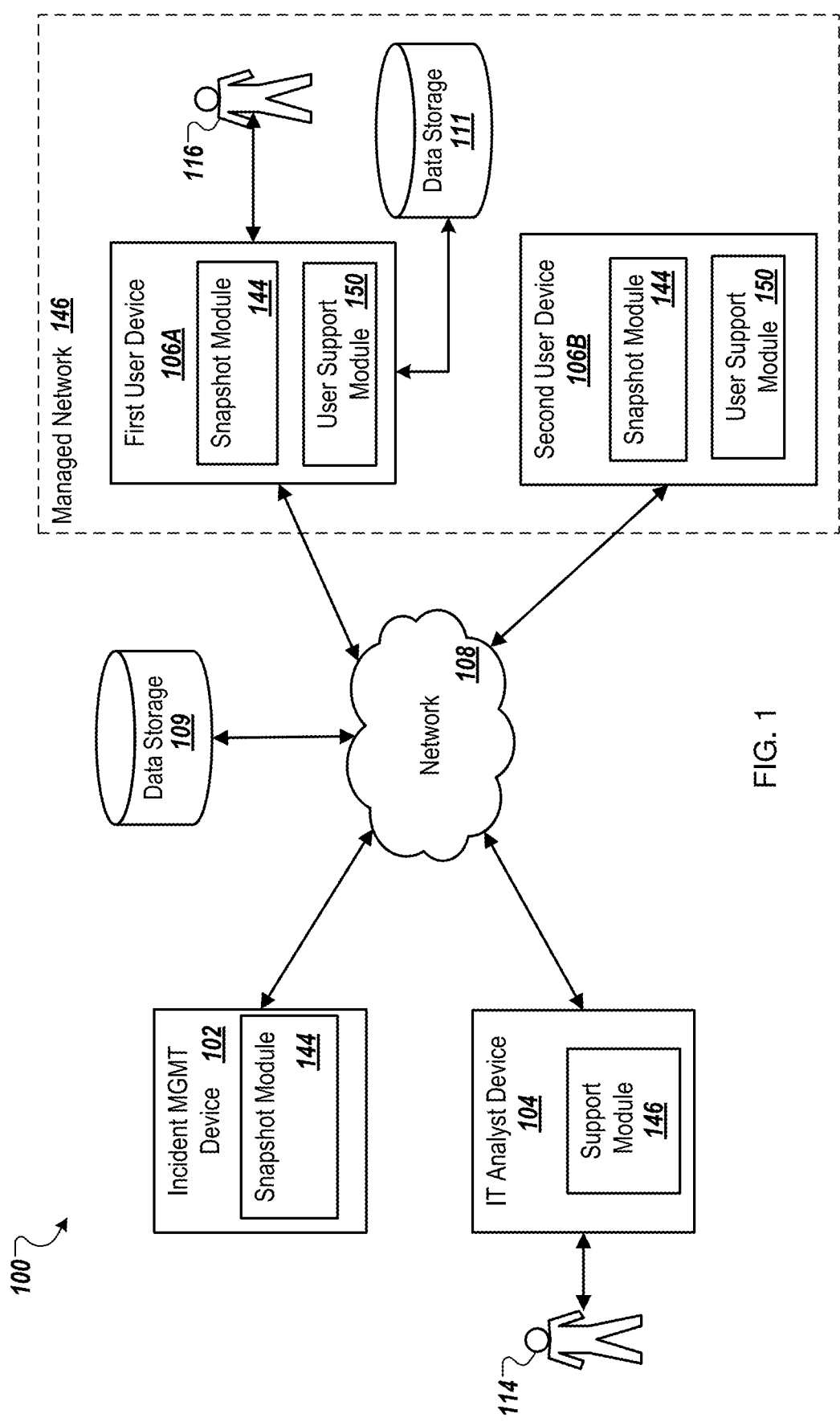
FIG. 1 depicts an example operating environment in which some embodiments of the present disclosure may be implemented.

Information technology (IT) support services may include an incident management service among other software services. For instance, the IT support services may include incident management service along with endpoint management, network security, application control, patch management service, and the like. The IT support services, or some subset thereof, may be provided to multiple user devices. The user devices may be included in a managed network that is communicatively coupled to one or more computing devices that provide the IT support services. For instance, the IT support services may be provided via a cloud network that communicatively connects the user devices with the computing devices providing the IT support services.

The incident management service may be implemented to diagnose and/or correct technical issues that arise on the user devices. Some incident management services implement a support ticket system or another suitable system to report technical issues. The support ticket system or the reporting system may operate through submission of a support ticket or notification by a user who is associated with one of the user devices. The support ticket or information related to the support ticket is then reviewed by an IT support analyst. The IT support analyst may diagnose a technical issue that is the cause of the support ticket. In some circumstance, a correction may be implemented on an effected user device.

In conventional incident management services, the IT support analyst may have limited information from which to diagnose the technical issue. For instance, in the conventional incident management services, IT support analysts may rely on the information in the support ticket, screenshots of an error message, information gathered after-the-fact (e.g., following an initial report), and perhaps some discussion with the user. The limitation of this information may make it difficult or impossible to properly diagnose a cause of the technical issue.

Additionally, between the submission of the support ticket and the IT support analyst addressing the support ticket, a state of the user device may change. The change may obscure information necessary for a proper diagnosis and correctly analyze the issue at the user device. For example, the support ticket may indicate that the user device is being affected by malicious software such as a virus. The malicious software may be configured to obscure its presence on the user device after being loaded or stored in a particular location. Accordingly, the state of the user device when the virus is first noticed may be different from the state of the machine during a subsequent period during which the virus is still negatively affecting the operation of the user device. Thus, the change in state of the effected user device along with limited information conceals a cause of a technical issue. Accordingly, the security threats and technical issues persist in the user devices.

These conventional systems may benefit from incident-responsive, computing system snapshot generation. For example, embodiments of the present disclosure address the problem of diagnosis of transient technical issues in computing systems. Some embodiments employ a snapshot or image of a user device to harvest computing parameters at the time of the technical issue. The snapshot or the image may be generated immediately responsive (e.g., within milliseconds) to a signal indicative of a technical issue. For instance, submission of the support ticket may be an example of the signal indicative of the technical issue. Immediately response to the signal, a snapshot of the user device may be generated.

The snapshot may include a data file that is comprised of a set of computing parameters. The snapshot may capture and record the set of computing parameters for short period of time (e.g., on the order of about twenty seconds in some embodiments). At least some of the set of computing parameters may be transient and subject to change.

Differences between the computing parameters in the snapshots may be indicative of a cause of the technical issue. In some embodiments, the snapshot generated at the time of the support ticket may be compared with snapshots generated of the user device prior to or following the support ticket. Additionally or alternatively, the snapshot generated at the time of the support ticket may be compared with snapshots generated of other, similar user devices prior to or following the support ticket submission.

The snapshot generated at the time of the submission of the support ticket may be compared to snapshots generated at one or more times other than when the support ticket is submitted. In some instances, the comparison may be based on a similarity score between two or more snapshots generated at different times. The similarity score may be calculated by converting the snapshots into numeric vectors and calculating a cosine similarity between the vectors. Additionally, the similarity score may be correlated to a time change between the compared snapshots.

In other embodiments the snapshots might be compared using another suitable data correlation operation to identify a cause of a technical issue. A selection of the data correlation operation may be based on the format of the snapshot, the type of parameters included in the snapshot, etc. Some alternative data correlation operations may include Pearson's correlation, Spearman's correlation, Kendall's Tau Jaccard similarity, Euclidean distance, Manhattan distance, and the like Based on the identified cause, an IT support analyst or a component providing the incident management service may implement a change to the user device to correct or address the technical issue. The change may modify a state of the user device. For instance, a problematic software may be re-installed, a patch may be re-loaded, a hardware setting may be adjusted, and the like.

Thus, embodiments described in the present disclosure provide a technical improvement to conventional IT support service systems. For instance, systems implementing incident-responsive, computing system snapshot generation may capture transient data and information at the time of a technical issue at a user device. The captured transient data and information may be used for diagnosis and/or correction of the technical issues at a user device in a managed network. The snapshot generation may reduce persistence of technical issues with transient characteristics and enables detection of technical issues that are previously undetectable in conventional systems. Additionally, the incident-responsive, computing system snapshot reduces time of diagnosis and reduces repeated support ticket submission pertaining to the same issue.

These and other embodiments are described with reference to the appended Figures in which like item number indicates like function and structure unless described otherwise. The configurations of the present systems and methods, as generally described and illustrated in the Figures herein, may be arranged and designed in different configurations. Thus, the following detailed description of the Figures, is not intended to limit the scope of the systems and methods, as claimed, but is merely representative of example configurations of the systems and methods.

FIG. 1 depicts an example operating environment 100 in which some embodiments of the present disclosure may be implemented. The operating environment 100 may be configured to provide one or more IT support services to a first user device 106A and a second user device 106B (generally, user device 106 or user devices 106). The user devices 106 may be included in a managed network 146 in some implementations. In these and other embodiments, an incident management device 102 and an IT analyst device 104 may be communicatively coupled to the user devices 106 via a network 108. Coupling via the network 108 enables communication of data and information between the components (102, 104, and 106) of the operating environment 100.

In the depicted embodiment, the IT support services may include incident management services. The incident management services may include the IT analyst device 104 or an IT support providers 114 associated with the IT analyst device 104 diagnosing and/or correcting technical issues on the user devices 106. In some instances, the IT support services may be initiated or triggered by submission of a signal configured to indicate a technical issue at the user devices 106. Users 116A or 116B, who are associated with one of the user devices 106, may submit the signal. An example of the signal may include submission of a support ticket in a helpdesk ticket system. Consistent with this example, the technical issues might include a functional deficiency, a malfunctioning software application, a faulty hardware component, and the like.

In conventional implementations of an environment providing IT support services, submission of the notification signal may include one of the users 106 providing information to the incident management device 102. Additionally, the IT analyst device 104 may contact the user 106 to request information or to obtain an account of the technical issue. Accordingly, in these convention implementations, information available to the IT support provider 114 is limited. Thus, diagnosis and/or correction the technical issue may be difficult or impossible. This difficulty is especially relevant when the technical issue is transient, complex, or quickly changing.

Accordingly, one or more of the components in the operating environment 100 may be configured for generation of snapshots of computing devices such as the user devices 106. The generation of the snapshots may be performed responsive to incidents and/or a report of technical issues in the user devices 106. Additionally or alternatively, the generation of the snapshots may be performed responsive to triggering events such as defined workflows, customer scripts, etc. that may use the snapshots to quantify a state of the user devices 106.

The snapshots may include or be recorded in an image or data file. The data file includes a set of computing parameters that exist at the user device 106 at the time or immediately following the communication of the notification signal (e.g., within milliseconds). The data files may include a record of the set of computing parameters over a short period of time. The short period of time may be one second, ten seconds, twenty seconds, or another suitable period. A length of the period of time may depend on the computing parameter and/or hardware or software component of interest.

The set of computing parameters may be relevant in the diagnosis and/or correction of the technical issue. Indeed, in circumstances in which the technical issue is transient or complex, the snapshot may enable visibility of the state of the user device 106, which may change prior to analysis by the IT support provider 114 and following a report of the technical issue. Thus, embodiments of the present disclosure provide a technical improvement to the operating environment 100. For instance, the snapshots enable visibility of additional, previously unobtainable information at a particularly relevant time. The information may enable efficient diagnosis and correction of technical issues experienced by the user devices 106.

The operating environment 100 may include the incident management device 102; data storage 109 and 111; the IT analyst device 104, which is associated with the IT support provider 114; the user devices 106, which are associated with the users 116A and 116B; and the network 108. One or more of the components of the operating environment 100 may be included in a cloud-based network, an on-premises network, a managed network, managed subnetwork, or another suitable network computing environment. For instance, in the depicted embodiment, the user devices 106 are included in the managed network 146. The managed network 146 may be a portion of a cloud network including components of the operating environment 100. Some additional details of some suitable networks may be as described in U.S. patent application Ser. No. 16/287,335, which is incorporated herein in by reference in its entirety. In some embodiments, the user devices 106 may be arranged according to another network configuration. Each of the components of the operating environment 100 are described in the following paragraphs.

The network 108 may include any communication network configured for communication of signals between any of the components (e.g., 102, 104, and 106) of the operating environment 100. The network 108 may be wired or wireless. The network 108 may have numerous configurations including a star configuration, a token ring configuration, or another suitable configuration. Furthermore, the network 108 may include a local area network (LAN), a wide area network (WAN) (e.g., the Internet), and/or other interconnected data paths across which multiple devices may communicate. In some embodiments, the network 108 may include a peer-to-peer network. The network 108 may also be coupled to or include portions of a telecommunications network that may enable communication of data in a variety of different communication protocols.

In some embodiments, the network 108 includes or is configured to include a BLUETOOTH® communication network, a Z-Wave® communication network, an Insteon® communication network, an EnOcean® communication network, a Wi-Fi communication network, a ZigBee communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 108 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the incident management device 102, the user devices 106, the data storage 109 and 111, and the IT analyst device 104.

The user devices 106 may include hardware-based computing systems. The user devices 106 may generally refer to computing assets, end points, or devices that are implemented in the managed network 146. The user devices 106 may include a laptop computer, a desktop computer, a mobile device (e.g., tablet, smart phone, etc.), a printer, a server device, a smart screen, a telephone system, and the like.

The managed network 146 includes two or more of the user devices 106 and potentially other computer devices that are managed to facilitate proper operation of the user devices 106. Some examples of the managed network 146 may include, for instance, an office, governmental network, an enterprise network, or business network.

In the depicted embodiment, the user devices 106 may be similar. Similarity between the user devices 106 indicates that the first user device 106A may be used to diagnose a technical issued experienced on the second user device 106B and vice versa. Additionally, similarity may indicate consistent formatting, use, type, etc. between the user devices 106 which may enable comparison between the user devices 106 for incident diagnosis. For example, the first user device 106A may include similar features, components, configurations, network settings, permissions, etc. Similarity between the user devices 106 enable comparison of a first snapshot of the first user device 106A to a second snapshot of the second user device 106B.

In some embodiments, the user devices 106 may include or be communicatively coupled to the data storage 109 and/or 111. The data storage 109 and 111 may include memory as described with reference to memory 712 of FIG. 7. The data storage 109 and 111 may be incorporated locally in the user device 106 or an on-premises database server. In some embodiments, one or more of the data files and messages may be stored on the data storage 109 or 111. For instance, data files of snapshots may be stored locally at the user devices 106. Local storage may improve security or limit access to information in the data files. The data files and messages may be access later by the IT analyst device 104.

The user devices 106 may have loaded thereon one or more software components and may include one or more hardware components. The software components may include, for instance, operating systems, component drivers, software applications, and the like. The hardware components may include storage devices, processors, monitors, user devices, graphic cards, sound cards, and the like. The user devices 106 may develop technical issues or the technical issues may arise as the user devices 106 age, the systems are updated, or the users 116 introduce issues into the user devices 106.

In the depicted embodiment, the user devices 106 may include a user support module 150 and a snapshot module 144. The user support module 150 may enable interface with the users 116. In particular, the user support module 150 may provide an incident report system, which allows the user 116 to generate and submit the signal indicative a technical issue such as an incident report or a support ticket. For example, the user support module 150 may be configured to display to the users 116 one or more icons. Selection of one or more of the icons by the user 116 may result in the signal being communicated to the incident management device 102 and/or the snapshot module 144. The snapshot module 144 is configured to configured to generate the snapshot as describe below. Alternatively, the user support module 150 may enable the users 116 to define one or more workflows or scripts. The workflows or scripts may be communicated to the snapshot module 144 to trigger snapshot generation.

The user devices 106 may be associated with the users 116A and 116B (generally, user 116 or users 116). The users 116 may include a person or set of people who regularly operate or are otherwise affiliated with the user devices 106. In some implementations, the users 116 may be uniquely associated with one of the user devices 106. The user 116 may operate one of the user devices 106 or another user device to generate the signal indicating a technical issue and communicate the signal to the incident management device 102.

For instance, the users 116 may interface with the user support module 150 to generate the signal. In some embodiments, the signal may include information related to the user device 106 experiencing the technical issue (e.g., device identifier, IP address, etc.), the nature of the technical issue, identification of the user 116, subsystems effected, priority or urgency, other relevant information (e.g., when the technical issue started, other corrective measures, etc.), or combinations thereof. Additionally or alternatively, the signal may include a triggering signal or protocol. The triggering signal or protocol may be used by the snapshot module 144 to initiate snapshot generation.

In some embodiments, the user support module 150 may include a ticket-based helpdesk system. In these and other embodiments, the user 116 may generate a support ticket, which corresponds to the incident report, by either filling out an electronic form or selecting an electronic icon with information related to a technical issue on the user device 106. The support ticket may be communicated to the incident management device 102.

The user devices 106 may form or be included in the managed network 146. In some embodiments, one or both of the user devices 106 may be affiliated with a separate organization from the incident management device 102 and the IT analyst device 104. For instance, the user devices 106 may be a customer of a second entity that operates the incident management device 102 and the IT analyst device 104. In these embodiments, the user devices 106 may operate on a separate intranet that may form a part of the operating environment 100. In some embodiments, one or both of the user devices 106, the IT analyst device 104, and the incident management device 102 may be associated with a common organization. In these embodiments, the user devices 106, the IT analyst device 104, and the incident management device 102 may be connected to a local intranet or an enterprise network, for instance.

The IT analyst device 104 may include hardware-based computing systems. The provider devices 104 generally refer to computing assets or devices that are implemented to provide IT support the user devices 106. For example, the IT analyst device 104 may include laptop computers, desktop computers, mobile devices (e.g., tablets, smart phones, etc.), server devices, and the like.

In some embodiments of the operating environment 100, the IT analyst device 104 remotely access and operate the user devices 106 via the network 108. The remote access may enable investigation to the user devices 106 or systems thereof. Additionally, while operating the user devices 106, the IT analyst device 104 may communicate control signals that result in the changes to the user devices 106. In most circumstance, the changes are implemented to correct technical issues or incidents on the user devices 106. For instance, the changes may include installing patches or updates, downloading software or data, uninstalling unauthorized software, reloading or changing a setting on a software application or hardware device, installing new software, scanning the user device 106, similar changes, combinations thereof, and the like.

The IT analyst device 104 may be associated with the IT support provider 114. As described with reference to the user devices 106, the association between the IT support provider 114 and the IT analyst device 104 may indicate that the IT support provider 114 regularly or normally operate the IT analyst device 104. Thus, information and signals directed to the IT support provider 114 may be received by the IT analyst device 104.

The IT analyst device 104 may be configured to provide IT support services to the user devices 106 via a browser-based interface. For instance, the IT analyst device 104 may be configured to receive or access data files and snapshots related to the user devices 106 via the browser-based interface. Additionally, the IT analyst device 104 may also be configured to implement a comparison between the data files to determine a cause of the technical issue using the browser-based interface and may be configured to access the user devices 106 remotely via the network 108 and communicate commands and control signals to the user devices 106 to implement changes or corrections to the user devices 106 or subsystems on the user devices 106. In some embodiments, the user support module 150 may similarly be configured to receive or access data files and/or implement a comparison between data files. In some embodiments, the IT analyst device 104 may include an application configured to perform one or more of the operations described above.

The incident management device 102 may include a hardware-based computing system. The incident management device 102 is configured to communicate with the IT analyst device 104 and the user devices 106 via the network 108. The incident management device 102 may have loaded on it the snapshot module 144. The snapshot module 144 of the incident management device 102 may be substantially similar to and may correspond to the snapshot module 144 loaded on the user devices 106. Functions and operations attributed to the snapshot modules 144 may be performed at one or both of the incident management device 102 and the user devices 106.

The snapshot module 144 may be configured to perform remote computing device diagnosis in the operating environment 100 using snapshot generation. The remote computing device diagnosis may be based on snapshots or data files including computing parameters of the user devices 106. For example, in some embodiments, the snapshot module 144 may be configured to receive a signal that triggers generation of a snapshot. The signal may be indicative of an intermittent technical state of one of the user devices 106. Additionally or alternatively, the signal may be associated with a protocol, a workflow, or a script that initiates the snapshot.

In some embodiments the signal may be triggered responsive to input by one of the users 106. For instance, the input may be received response to selection of an icon by the user 106 on the user support module 150. Additionally or alternatively, the signal may be triggered responsive to a specific event on one of the user devices 106 such as a particular type of failure or malfunction, which may be defined by a workflow or script in some instances.

Immediately responsive to the signal (e.g., on the order of milliseconds), the snapshot module 144 may be configured to interrogate the user device 106 for a set of computing parameters. The set of computing parameters may be related to an intermittent technical state at the user device 106. The set of computing parameters may include at least one transient parameter that is present at a first time at which the intermittent technical state exists on the user device 106 and not present a second time following the first time. The set of computing parameters may be recorded for a period of time (e.g., ten or twenty seconds) in some circumstances.

The snapshot module 144 may be configured to record the set of computing parameters in a data file. In some embodiments, the data file may be formatted according to a human-readable data-serialization language and a flat file format in some embodiments such as YAML or JSON. The snapshot module 144 may link the data file to a message that describes the intermittent technical state in a network service system such as the operating environment 100. The snapshot module 144 may communicate the data file to the IT analyst device 104 along with the message. In some embodiments, the data file may be additionally or alternatively processed to generate a derivative file, which may be used for data correlation or data analysis.

The snapshot module 144 may store the data file and/or the message in one or both of the data stores 109 or 111. For instance, the snapshot module 144 may store the data file and/or the message in an on-premises data store such as the data storage 111 of the user device 106 or on cloud data store such as the data storage 109.

The snapshot module 144 may further interrogate the one or both of the user devices 106 at one or more times outside receipt of the signal. As described above, the interrogation of the user devices 106 may be according to a protocol or script, which may be developed or defined by the users 116 or an administrator. The snapshot module 144 may record the computing parameters for each of the one or more times in one or more additional data files. The additional data files may be stored remotely from the user devices 106 such as in the data storage 109 or may be stored locally in the data storage 111.

The snapshot module 144 may identify a cause of the intermittent technical state based on a difference between the data file and one or more of the additional data files. For instance, the snapshot module 144 may identify a difference in at least one computing parameter based on a comparison between the data file and one or more of the additional data files. The difference may be related to the cause of the intermittent technical state.

In some instances, the comparison may be based on a similarity score between two or more snapshots generated at different times. In these and other embodiments, the snapshot module 144 may be configured to convert two or more snapshots into a derivative file such as a numeric vector. The snapshot module 144 may then calculate a cosine similarity or another suitable data correlation operation between the vectors. Additionally, in some embodiments, the snapshot module 144 may correlate any identified differences to a time change between the compared snapshots.

After the cause is identified, a corrective action may be initiated. In some embodiments, the IT analyst device 104 may remotely implement at least one change on the user device 106. The change may be configured to mitigate the cause of the intermittent technical state.

In some embodiments, the snapshot module 144 may also be configured to generate baseline information of the user devices 106. The baseline information may be used record or monitor the state of the user devices in the managed network 146. In these and other embodiments, the snapshot module 144 may be configured to interrogate one or both of the user devices 106. For instance, the snapshot module 144 may be configured to interrogate the user devices 106 according to a particular schedule or protocol as described above. The interrogation may be configured to access or obtain a set of computing parameters related to or indicative of the state of the user devices 106. The snapshot module 144 may record the set of computing parameters from the user devices 106 in one or more baseline data files.

In some embodiments, the baseline data files may be formatted as described above. For instance, the baseline data files may be formatted according to a human-readable data-serialization language and a flat file format such as YAML or JSON or as a derivative file used in analysis. The snapshot module 144 may store the baseline data files using distributed version control system such as GIT or another suitable system.

The snapshot module 144 may receive a signal indicative of an intermittent technical state of one of the user devices 106. As described above, the signal may be triggered by user input, a protocol, a workflow, a script, a specific event on the user devices 106 or some combination thereof. Immediately responsive to the signal, snapshot module 144 may interrogate the user device 106 for the set of computing parameters. The set of computing parameters may be related to the intermittent technical state and may include at least one transient parameter that is present during at least a part of the period in which the intermittent technical state exists on the user device 106. For instance, the set of computing parameters may be recorded for a short period of time. This period of time may include a first period in which the intermittent technical state exists and a second portion in which it does not.

The snapshot module 144 may record the set of computing parameters in a transient parameter data file. The transient parameter data file may be formatted according to the human-readable data-serialization language and the flat file format. The snapshot module 144 may link the transient parameter data file to a message describing the intermittent technical state. The snapshot module 144 may communicate the transient parameter data file to the IT analyst device 104 along with the message. The snapshot module 144 may store one or more or a combination of the transient parameter data file, the baseline data files data file, and the message in the on-premises data store (e.g., at the data storage 111) or on cloud data store (e.g., the data storage 109).

The snapshot module 144 may compare the transient parameter data file with one or more of the baseline data files. The snapshot module 144 may identify a difference in at least one parameter based on the comparison. The difference may be related to the cause of the intermittent technical state. The IT analyst device 104 4 may remotely implement a change on the user device 106 to mitigate or correct the cause of the intermittent technical state. In some embodiments, the interrogating and the recording are implemented through execution of a set of non-transitory computing instructions stored locally at the first computing device. The set of non-transitory computing instructions include one or more real time sensors.

The snapshot module 144, the user support module 150 and components thereof may be implemented using hardware including a processor, a microprocessor (e.g., to perform or control performance of one or more operations), a field-programmable gate array (FPGA), or an application-specific integrated circuit (ASIC). In some other instances, the snapshot module 144, the user support module 150 and components thereof may be implemented using a combination of hardware and software. Implementation in software may include rapid activation and deactivation of one or more transistors or transistor elements such as may be included in hardware of a computing system (e.g., the incident management device 102, user devices 106, or the IT analyst device 104). Additionally, software defined instructions may operate on information within transistor elements. Implementation of software instructions may at least temporarily reconfigure electronic pathways and transform computing hardware.

The IT support service implemented in the operating environment 100 may be implemented with one or more other complementary or related services. For example, the IT support service may be provided along with device and user management, application update services, hardware replacement, network security, data storage and data management, and the like. The IT support service and the complementary services may be integrated and provided as a unified management system to multiple entities or organizations that each include one or more of the user devices 106. For instance, the first user device 106A might be included in a first enterprise network and the second user device 106B might be included in a second enterprise network. The incident management device 102 and the provider devices 104 may be configured to support both enterprise networks simultaneously.

Modifications, additions, or omissions may be made to the operating environment 100 without departing from the scope of the present disclosure. For example, the operating environment 100 may include one or more incident management device 102, one or more IT analyst devices 104, two or more user devices 106, one or more data storage devices 109 and 111, or any combination thereof. Moreover, the separation of various components and devices in the embodiments described herein is not meant to indicate that the separation occurs in all embodiments. For example, the data storage 109 may be incorporated in the incident management device 102 or with one of the user devices 106. Moreover, it may be understood with the benefit of this disclosure that the described components and servers may generally be integrated together in a single component or server or separated into multiple components or servers.

Figure 2:
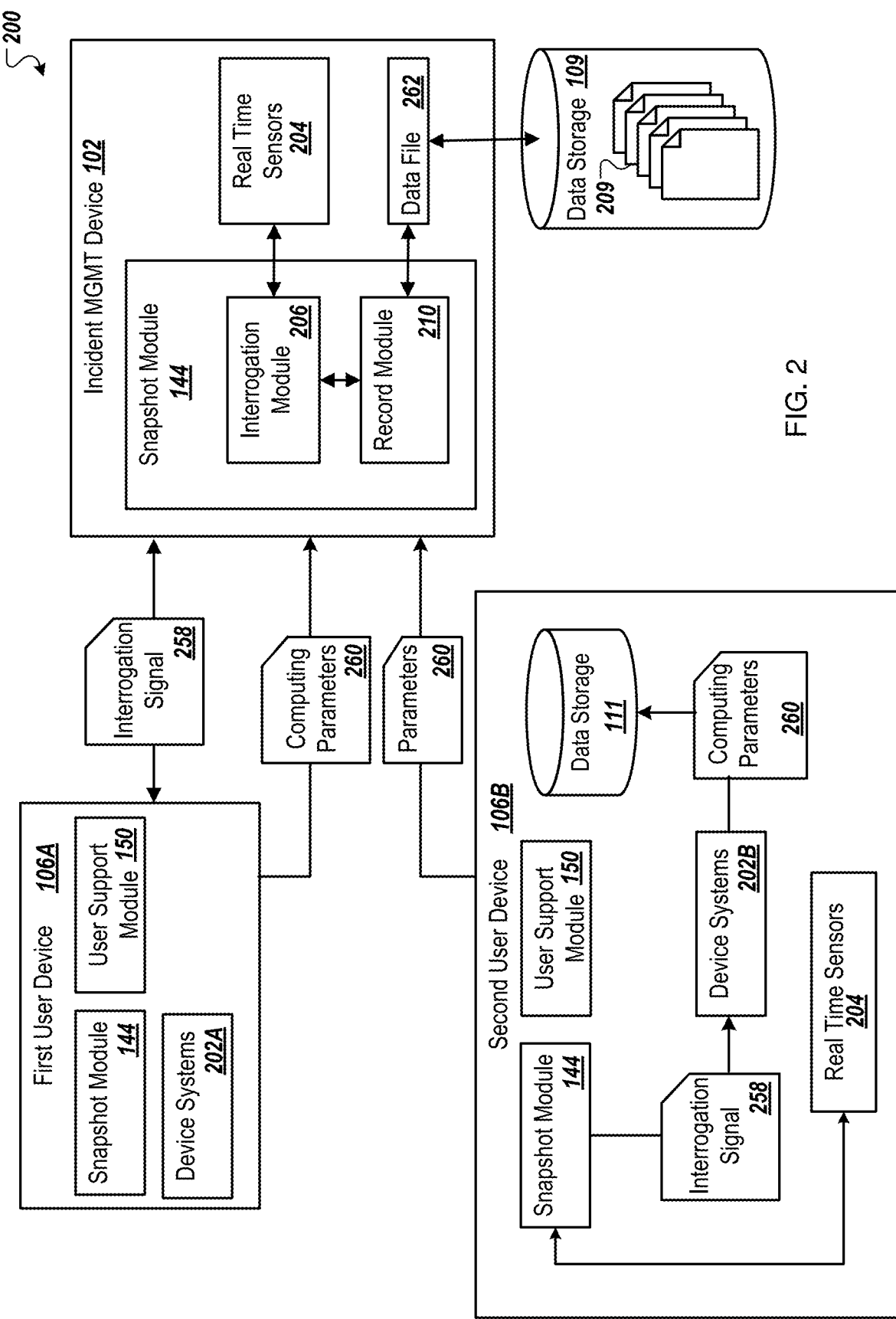
FIG. 2 is a block diagram of an example baseline snapshot generation process (baseline process) that may be implemented in the operating environment of FIG. 1.

FIG. 2 is a block diagram of an example baseline snapshot generation process (baseline process) 200, according to at least one embodiment of the present disclosure. The baseline process 200 may be implemented in the operating environment 100 of FIG. 1 or in another suitable environment. The baseline process 200 of FIG. 2 includes one or more components (e.g., 106A, 106B, and 102) previously described with reference to FIG. 1.

Some components of the operating environment 100 are omitted from FIG. 2 such as the network 108. Nevertheless, it may be understood that the baseline process 200 may include one or more components of the operating environment 100. For instance, communication of information and data in the baseline process 200 may be via the network 108. In some embodiments of the baseline process 200, a cloud network may be configured to communicatively connect one or more of the components depicted in FIG. 2.

The baseline process 200 may be implemented to generate baseline data files 209 and 262, which may also be referred to as additional data files in the present disclosure. The baseline data files 209 and 262 may be used for comparison with transient parameter data files or snapshots, which may be generated while the first user device 106A experiences a technical issue. For instance, the baseline data files 209 and 262 may provide computing parameters during normal operating conditions or conditions outside (e.g., prior to or following) a transient technical issue experienced at the user device 106. The baseline data files 209 and 262 may accordingly include parameters of the user devices 106 while the user devices 106 are operating. Thus, identifying a difference in parameters between the baseline data files 209 and 262 and the transient parameter data files may enable a diagnosis of a cause of the technical issue experienced at the user device 106.

The baseline process 200 includes one or more interrogations. The interrogations may be implemented on one or both of the user devices 106. In embodiments in which interrogations are performed relative to both of the user devices 106, the user devices 106 may be similar or may include a similar characteristic. For instance, the user devices 106 may include the similar software programs, may include similar permissions, may be similar or identical machines, may include the similar hardware, may be included on a similar spot or location on a network, may be issued to users with similar roles, other similar characteristics, or combinations thereof.

The interrogations pull or access computing parameters on the user devices 106. For example, the interrogations may pull or access a set of the computing parameters all at one time to generate an overall view of the state of the user devices 106. The computing parameters may be related to one or more characteristics of the user devices 106 as well as a state of a computer network that includes the user devices 106. The computer parameters may accordingly be indicative of the state of the user devices 106. Some examples of the computing parameters might include a current central processing unit (CPU) use of the user devices 106, a process currently running on the user devices 106, a service loaded on the user devices 106, current memory use of the user devices 106 or applications on the user devices 106, current network traffic, and the like.

The set of computing parameters may be sampled or recorded over a period of time. For example, a CPU may be interrogated for twenty seconds. During the twenty seconds, the set of computing parameters may be sampled and recorded in one of the data files 209.

In some embodiments, the interrogations may occur according to a schedule, a workflow, a script, a protocol, or some combination thereof. For example, an interrogation may occur every week, every quarter, every year, or another suitable period of time. Additionally, the interrogation may occur following an update to hardware or software, may occur following technical issues or concurrent with technical events, and the like. In embodiments in which the interrogation is associated with technical events (e.g., a patch installation, software update, etc.), a data file may be annotated with the technical event.

The interrogations may be performed prior to a technical issue, which may enable the IT support provider to look at a historical record of the state of the user device 106 experiencing a technical issue. Additionally or alternatively, the interrogation may be performed following a technical issue. For example, the first user device 106A may experience a technical issue. Following the technical issue, the second user device 106B or the first user device 106A may be interrogated, which may provide baseline data files for comparison and detection of causes to the technical issue.

The interrogations in the baseline process 200 may be locally performed at the user device 106. For instance, the second user device 106B may include one or more of the snapshot module 144, the user support module 150, device systems 202B, and the data storage 111.

The snapshot module 144 may be configured to communicate an interrogation signal 258. In some embodiments, the interrogation signal 258 may include a MQ telemetry transport (MQTT) message. The interrogation signal 258 may interface with device systems 202B to access or pull computer parameters 260. Some examples of the device systems 202B may include hardware or software system of the second user device 106B. For instance, the device systems 202B may include a CPU, a system that monitors the CPU, a software application monitor system, and the like.

The computing parameters 260 or a data file based on the parameters 260 may be stored locally on the data storage 111. Local storage may improve security associated with information in the data file. In some embodiments, the parameters 260 or a datafile based on the parameters 260 may be locally stored and managed by an agent loaded on the second user device 106B.

Additionally or alternatively, the computing parameters 260 or a datafile based on the computing parameters 260 may be communicated to the incident management device 102. A record module 210 may generate a baseline data file 262. The baseline data file 262 may be stored remotely in the data storage 109.

The baseline data file 262 may be formatted according to the human-readable data-serialization language and/or the flat file format. Format of the baseline data file 262 using the the human-readable data-serialization language and/or the flat file format may improve reviewability an IT support provider. An example of the the human-readable data-serialization language and/or the flat file format may be a YAML or a JSON format. In some embodiments, the data file may be processed to generate a derivative file. The derivative file may be a numeric vector or another suitable data file, which may be used for data correlation or data analysis.

In some embodiments, as stated above, the second user device 106B may perform the interrogation and generate the computing parameters 260 according to a protocol. The computing parameters 260 or data files based thereon may be stored locally. The incident management device 102 may request one or more of the computing parameters 260 or data files. For instance, in response to a technical issue at the first user device 106A or the second user device 106B, the incident management device 102 may request one or more of the computing parameters 260 or data files for comparison. The comparison may be performed by an IT support analyst and/or by an automated process (e.g., performing a data correlation operation).

In some embodiments, the snapshot module 144 of the incident management device 102 may interface with the snapshot module 144 of the second user device 106B to perform one or more operations described above. For instance, an interrogation module 206 may communicate a triggering signal to the snapshot module 144 of the second user device 106B, which may initiate a local interrogation. Additionally or alternatively, the interrogation module 206 may communicate a request signal to initiate transfer of the computing parameters 260 by the second user device 106B.

The snapshot module 144 may utilize real time sensors 204. The real time sensors 204 are depicted at the second user device 106B and at the incident management device 102. The real time sensors 204 may include locally stored applications or remotely stored and implemented applications. The real time sensors 204 may be provide the basis of the interrogation signal 258. For instance, the real time sensors 204 may be configured to pull or access specific parameters at specific times and over specific periods of time. The real time sensors 204 operate in substantially real time, which enables the collection of the computing parameters 260 in at a defined time instead of an after-the-fact interrogation.

The user support module 150 may enable the user 116 to define the real time sensors 204. For instance, the user support module 150 may enable the user 116 to write scripts and protocols using the real time sensors 204 and thus the interrogation signal 258.

In some embodiments, the interrogations may be remotely and/or centrally controlled by the incident management device 102. In these and other embodiments, the interrogation module 206 of the incident management device 102 may communicate the interrogation signal 258 to the first user device 106A. The interrogation signal 258 may interface with devices systems 202A of the first user device 106A to pull or access the computing parameters 260.

The computing parameters 260 may be communicated to the incident management device 102. The computing parameters 260 may be processed by the record module 210. For instance, the record module 210 may generate the baseline data file 262 based on the computing parameters 260.

The baseline data file 262 may be stored at the data storage 109 or at another network data storage. Accordingly, the data storage 109 may store a set of baseline data files 209, which may be accessible by the snapshot module 144. As discussed above, the interrogation signal 258 may include a MQTT message and/or the baseline data files 262 and 209 may be stored using distributed version control system. The distributed version control system may include GIT or another suitable distributed version control system.

Figure 3A:
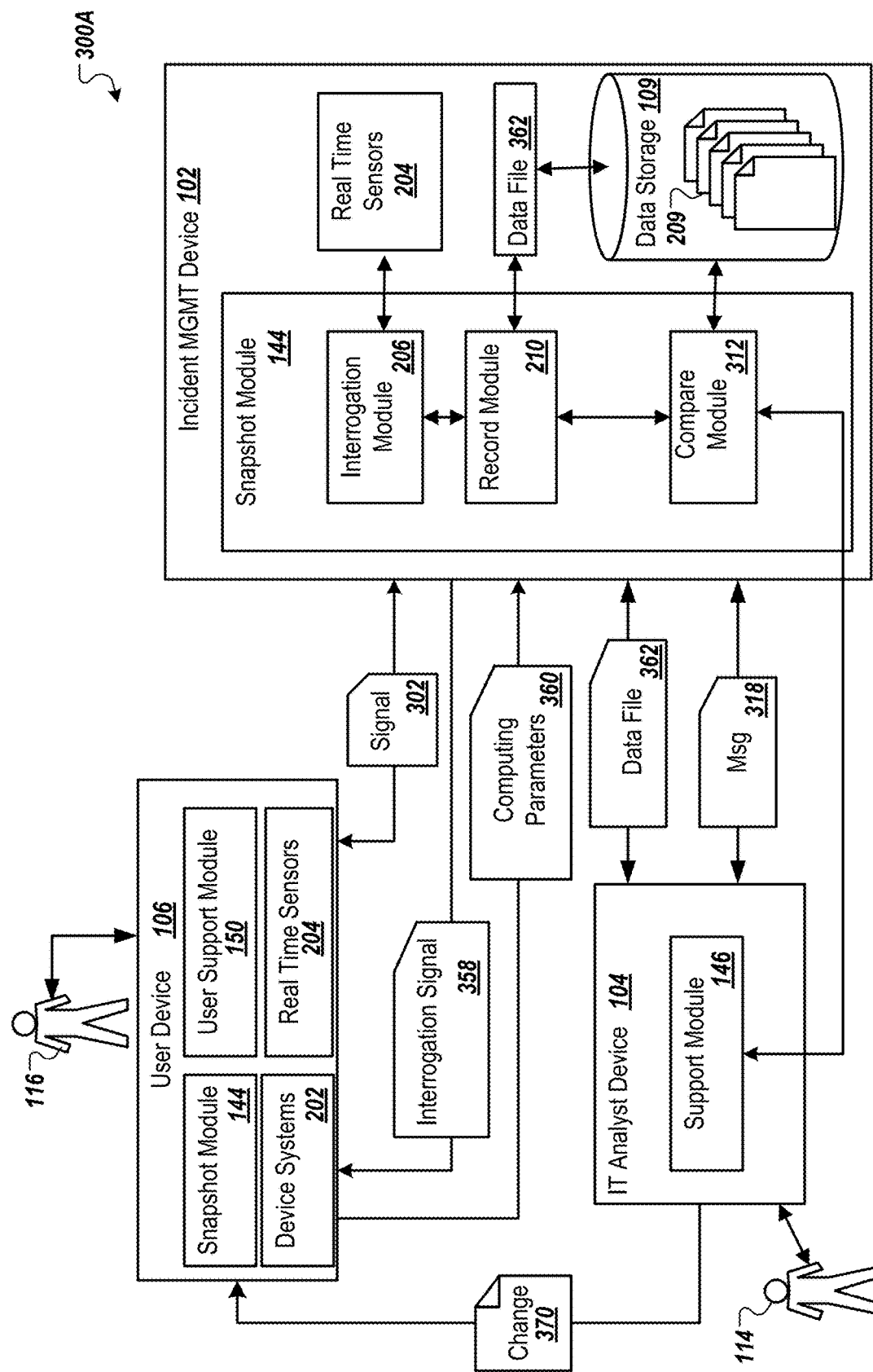
FIG. 3A is a block diagram of a first example transient parameter snapshot generation process (first transient process) that may be implemented in the operating environment of FIG. 1.

FIG. 3A is a block diagram of a first example transient parameter snapshot generation process (first transient process) 300A, according to at least one embodiment of the present disclosure. The first transient process 300A may be implemented in the operating environment 100 of FIG. 1 or another suitable operating environment. The first transient process 300A of FIG. 3A includes one or more components (e.g., 106, 104, 206, 210, 209, and 102) previously described with reference to FIGS. 1 and 2. Some components of the operating environment 100 are omitted from FIG. 3A such as the network 108. Nevertheless, it may be understood that the first transient process 300A may include one or more components of the operating environment. For instance, communication of information and data in the first transient process 300A may be via the network 108. In some embodiments of the first transient process 300A, a cloud network may be configured to communicatively connect one or more of the components depicted in FIG. 3A.

The first transient process 300A may be implemented to generate transient parameter data files 362, which may also be referred to as a data file in the present disclosure. The transient parameter data files 362 may be used for comparison with baseline data files or snapshots, which may be generated according to the baseline process 200. For instance, the baseline data files 209 and 262 of FIG. 2 may provide computing parameters during normal operating conditions or conditions outside (e.g., prior to or following) a transient technical issue experienced at the user device 106. The transient parameter data files 362 may include parameters while the user device 106 is experiencing the technical issue. By comparing the transient parameter data files 362 with one or more of the baseline data files 209 and 262, a difference may be identified, which may be related to a cause of the transient technical issue.

The first transient process 300A may be based on or initiated by a signal 302. The signal 302 may be communicated from the user device 106 to the incident management device 102 or may be communicated to snapshot modules 144 of the incident management device 102 and/or the user device 106. The signal 302 is indicative of an intermittent technical state or issue experienced at the user device 106. The signal 302 may be triggered responsive to input by the user 116 on the user device 106. The input may include a selection of an icon by the user 116 on the user device 106. For example, the signal 302 may include or may be generated responsive to a support ticket submission by the user 116 on the user device 106. Specifically, in some embodiments, the user 116 may select a support ticket icon on the user device 106. The selection may begin a manual input process of the support ticket process as well as communicating the signal 302.

Additionally or alternatively, the signal 302 may be triggered by a specific event or technical state of the user device 106. For instance, the user device 106 may experience an unexpected software application failure. Responsive to the unexpected software application failure, the signal 302 may be generated and communicated.

The signal 302 may be received by the interrogation module 206. Immediately or substantially in real time (e.g., on the order of milliseconds and without any material delay) responsive to the signal 302, the interrogation module 206 may communicate an interrogation signal 358 to the user device 106. The interrogation signal 358 may be substantially similar to and may correspond to the interrogation signal 258. The interrogation signal 358 may interface with the device systems 202 of the user device 106. The interrogation signal 358 may access or pull a set of computing parameters related to an intermittent technical state of the user device 106. In particular in some embodiments, the computing parameters may include at least one transient parameter that is present at a first time at which the intermittent technical state exists on the user device 106 and is not present a second time following the first time. The parameters pulled or accessed by the interrogation signal 358 may be similar or identical to the parameters pulled or accessed by the interrogation signal 258. The interrogation signal 358 may be configured to sample or pull the computing parameters 360 over a short period of time.

Responsive to the interrogation signal 358, computing parameters 360 may be communicated to the incident management device 102. For instance, the computing parameters 360 may be communicated to the record module 210. The record module 210 may generate the transient parameter data files 362 based on the computing parameters 360. The transient parameter data files 362 may be stored in the data storage 109.

In some embodiments, the transient parameter data files 362 is formatted according to a human-readable data-serialization language and a flat file format such as YAML or JSON. Additionally or alternatively, a derivative file may be generated, which may enable automated processing or comparison. In some embodiments, the interrogation operation and the record operation may be implemented using the real time sensors 204, which are described above with reference to FIG. 2.

The incident management device 102 may link the transient parameter data files 362 to a message 318. The message 318 may describe the intermittent technical state of the user device 106 and/or a network service system including the user device 106 and the incident management device 102. The message 318 may be based on input provided by the user 116 or may be based on information associated with the support ticket.

The incident management device 102 may communicate the transient parameter data file 362 and the message 318 to the IT analyst devices 104. The transient parameter data file 362 and the message 318 may be used to diagnose the technical issue experienced at the user device 106. In some embodiments, the diagnosis of the technical issue may include identification of a cause of the intermittent technical state. Identification of the cause may include performing a comparison between the transient parameter data file 362 and one or more the baseline data files 209. The comparison may result in a difference in at least one parameter. The difference may be related to the cause of the intermittent technical state.

With combined reference to FIGS. 2 and 3A, the user device 106 of FIG. 3A may be the first user device 106A. The transient parameter data file 362 may be compared to the baseline data files 209 generated from interrogations of the first user device 106A (e.g., the same user device 106). Additionally or alternatively, the transient parameter data file 362 may be compared to baseline data files 209 generated from interrogations of the second user device 106A (e.g., another user device 106).

In some embodiments, the IT support provider 114 may use the IT analyst devices 104 to perform the comparison via a browser-based interface. For instance, the IT analyst devices 104 may be configured to interface with the compare module 312. The compare module 312 may enable visibility and access to the baseline data files 209 on the data storage 109 or stored locally on the user device 106. The baseline data files 209 may be accessed and then compared with the transient parameter data file 362.

Referring back to FIG. 3A, after the cause of the intermittent technical state is identified, a change 370 may be implemented at the user device 106. The change 370 may include any change to the hardware or software of the user device 106. In some embodiments, the change 370 may include a remote implementation of at least one change to the user device 106, which results in a transformation in at least one state or setting of the user device 106. The change 370 may mitigate or eliminate the cause of the intermittent technical state. For instance, the change may remove a problematic file, may change a permission, may reinstall a software application, perform another change, or some combinations thereof.

Figure 3B:
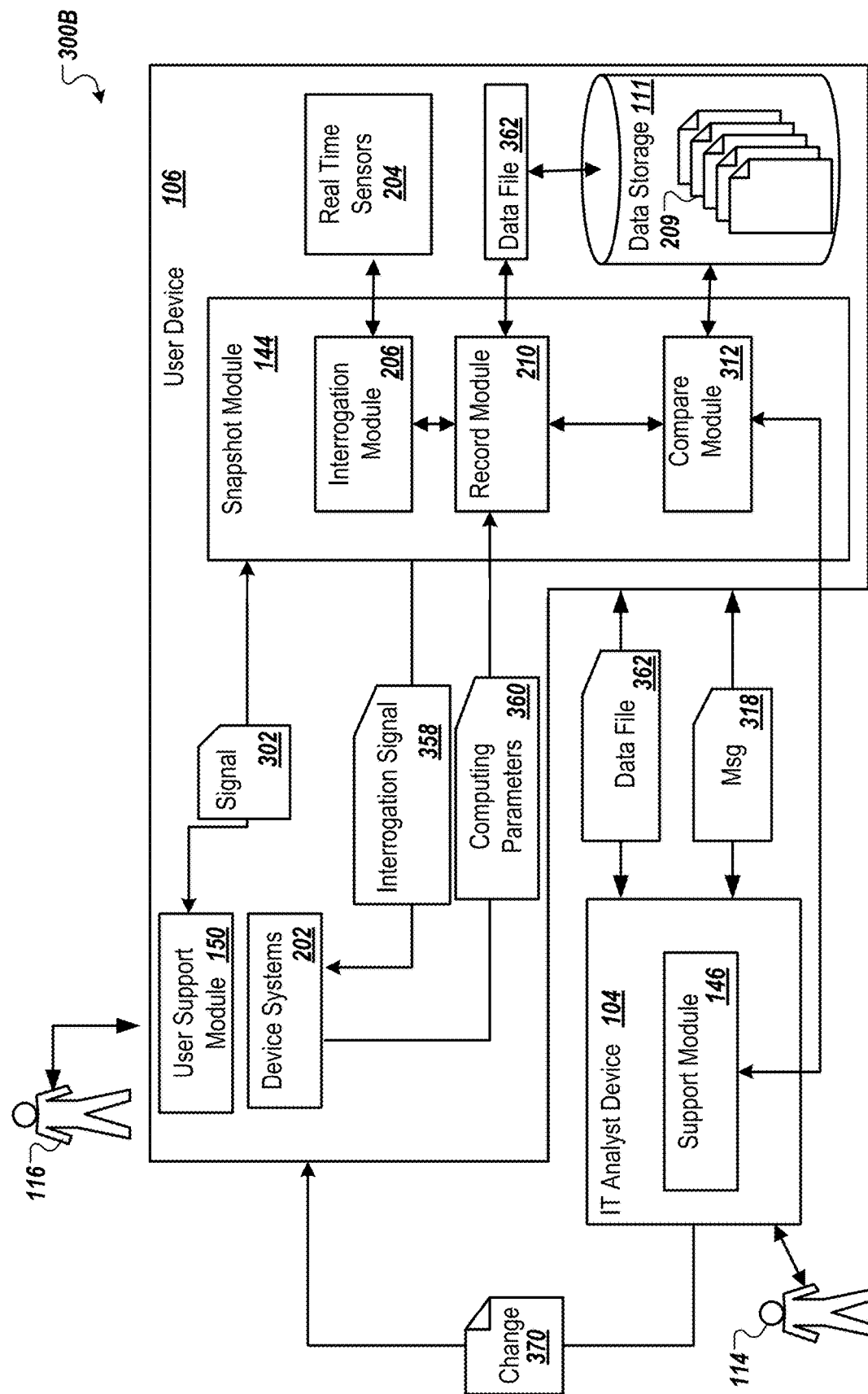
FIG. 3B is a block diagram of a second example transient parameter snapshot generation process (second transient process) that may be implemented in the operating environment of FIG. 1.

FIG. 3B is a block diagram of a second example transient parameter snapshot generation process (second transient process) 300B, according to at least one embodiment of the present disclosure. The second transient process 300B may be implemented in the operating environment 100 of FIG. 1 or another suitable operating environment. The second transient process 300B of FIG. 3B includes one or more components (e.g., 106, 104, 206, 210, and 209) previously described with reference to FIGS. 1-3A. Some components of the operating environment 100 are omitted from FIG. 3B such as the network 108. Nevertheless, it may be understood that the second transient process 300B may include one or more components of the operating environment. For instance, communication of information and data in the second transient process 300B may be via the network 108. In some embodiments of the second transient process 300B, a cloud network may be configured to communicatively connect one or more of the components depicted in FIG. 3B.

The second transient process 300B is substantially similar to the first transient process 300A except that the second transient process 300 occurs on the user device 106. For example, the second transient process 300B may be implemented to generate transient parameter data files 362, which may be used for comparison with baseline data files or snapshots. The transient parameter data files 362 may include parameters while the user device 106 is experiencing the technical issue. By comparing the transient parameter data files 362 with one or more of the baseline data files 209 and 262, a difference may be identified, which may be related to a cause of the transient technical issue.

The second transient process 300B may be based on or initiated by the signal 302. The signal 302 may be communicated from the user support module 150 to the snapshot module 144 of the user device 106. The signal 302 may be triggered responsive to input by the user 116 on the user device 106, responsive to a protocol or script, etc. The input may include a selection of an icon by the user 116 on the user device 106. For example, the signal 302 may include or may be generated responsive to a support ticket submission by the user 116 on the user device 106.

The signal 302 may be received by the interrogation module 206, which may immediately communicate an interrogation signal 358 to the device systems 202. The interrogation signal 358 may interface with the device systems 202 and may access or pull the computing parameters 360 as described above with reference to FIGS. 2 and 3A. The computing parameters 360 may be communicated to the record module 210. The record module 210 may generate the transient parameter data files 362 based on the computing parameters 360. The transient parameter data files 362 may be stored in the data storage 111 or remotely. In some embodiments, the transient parameter data files 362 is formatted according to a human-readable data-serialization language and a flat file format such as YAML or JSON. In some embodiments, the interrogation operation and the record operation may be implemented using the real time sensors 204, which are described above with reference to FIG. 2.

The transient parameter data files 362 may be linked to the message 318 and communicated to the IT analyst devices 104. The transient parameter data file 362 and the message 318 may be used to diagnose the technical issue experienced at the user device 106 as described elsewhere in the present disclosure. After the cause of the intermittent technical state is identified, the change 370 may be implemented at the user device 106.

It may be understood with the benefit of this disclosure that operations of the first transient process 300A and the second transient process 300B may be combined. For example, the incident management device 102 may communicate the interrogation signal 358, but the computing parameters 360 may be locally pulled and recorded. Additionally or alternatively, the comparison performed by the compare module 312 or the use of the real time sensors 204 may be implemented partially at the user device 106 and partially at the incident management device 102. Other combinations of operations are possible.

Figure 4A:
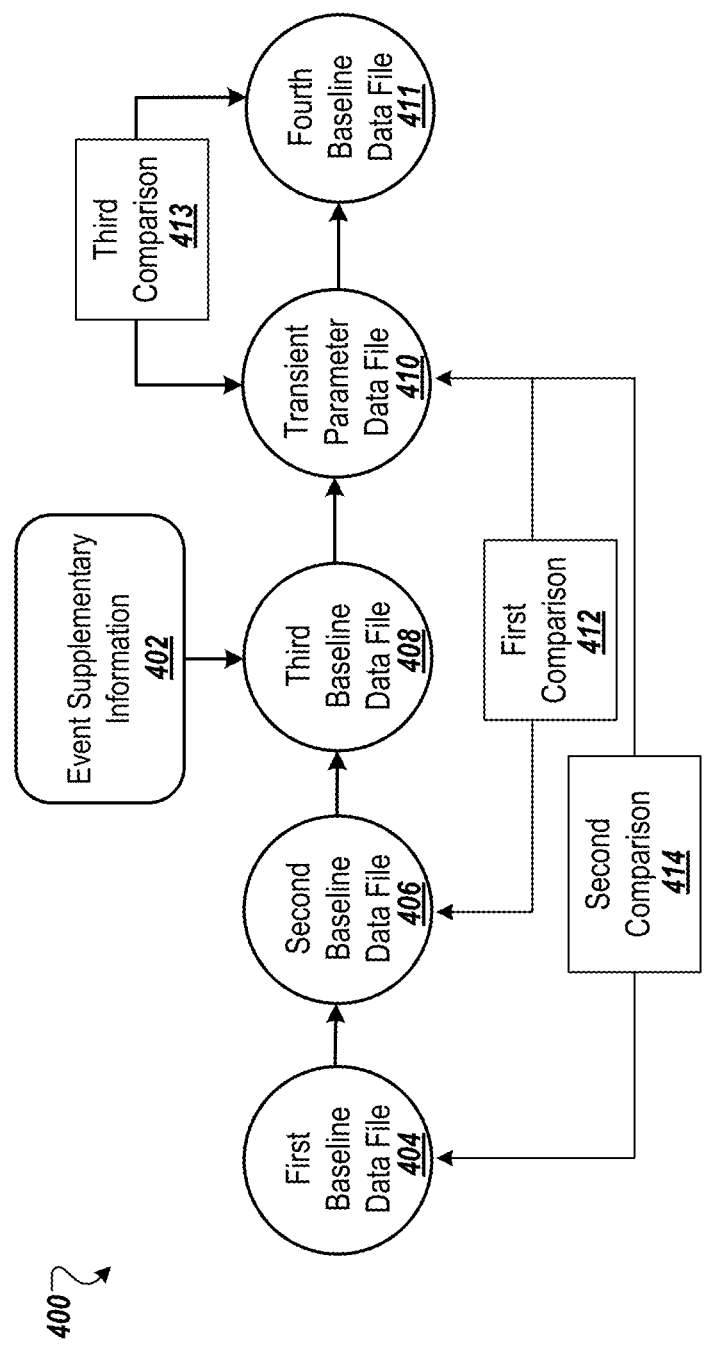
FIGS. 4A and 4B are block diagrams representing sets of data files that may be implemented in the baseline process of FIG. 2 and the transient processes of FIGS. 3A and 3B.
Figure 4B:
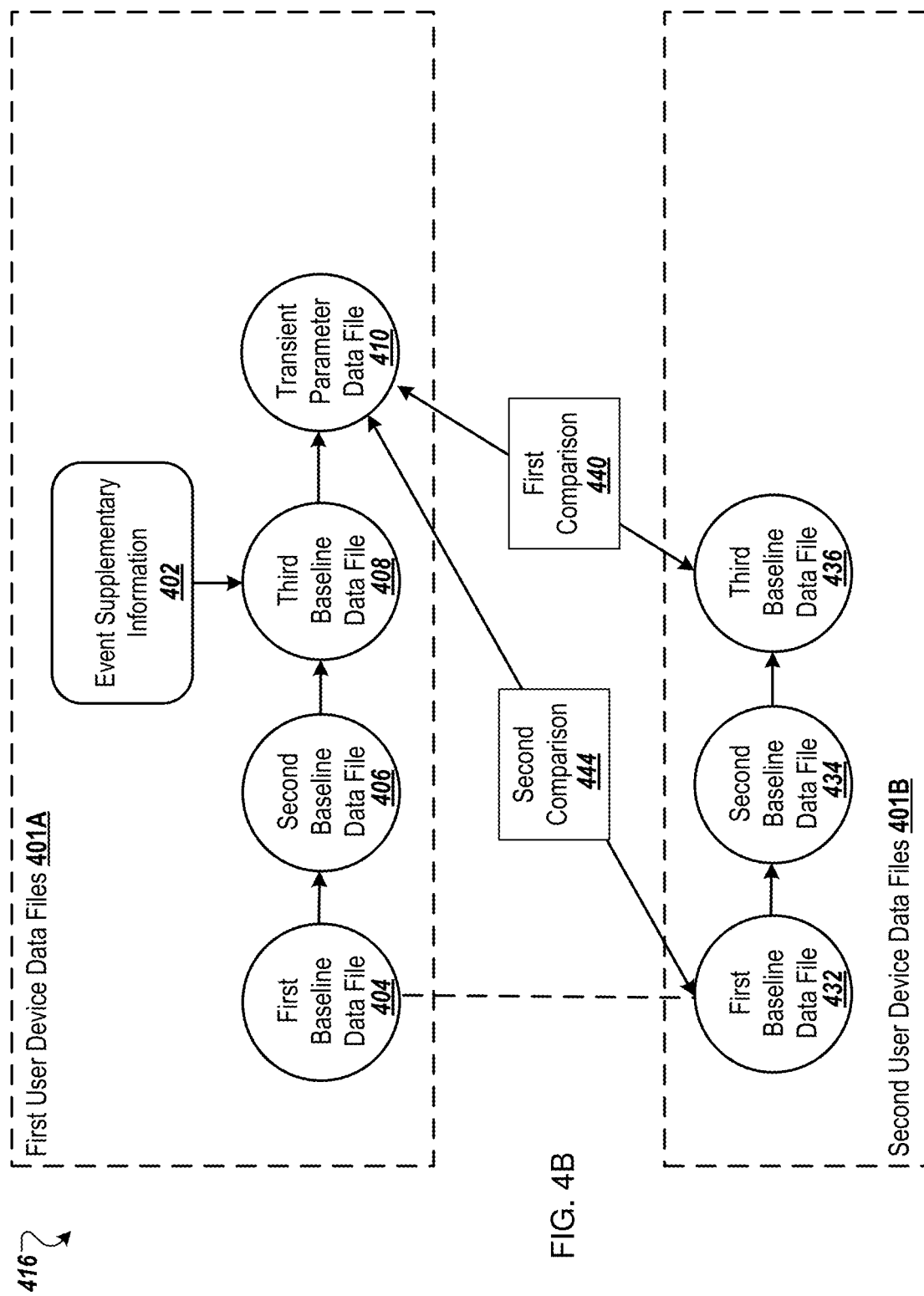

FIGS. 4A and 4B are block diagrams representing sets of data files 400 and 416. The sets of data files 400 and 416 are representative of data files, which are substantially similar to and correspond to the data files 209, 262, and 362 described with reference to FIGS. 2-3B.

FIG. 4A includes a first set of data files 400. The first set of data files 400 includes a first baseline data file 404, a second baseline data file 406, a third baseline data file 408, and a fourth baseline data file 411. The first set of data files 400 also includes a transient parameter data file 410. Each of the baseline data files 404, 406, 408, and 411 are based on interrogations of a user device such as the user device 106 outside times of a technical issue being experienced at the user device. The transient parameter data file 410 is a data file generated during the technical issue. The first baseline data file 404, the second baseline data file 406, and the third baseline data file 408, may be generated before the technical issue. Additionally, event supplementary information 402 may be associated with the third baseline data file 408. For instance, the supplementary information 402 may indicate that the third baseline data file 408 was initiated after or concurrent with a specific technical event. The fourth baseline data file 411 may be generated following the technical issue.

With combined reference to FIGS. 3A and 4A, the first set of data files 400 may be stored on the data storage 109 or locally on the user device 106. The compare module 312 may enable visibility to the first set of data files 400 by the IT analyst device 104. Additionally, the compare module 312 may enable one or more comparisons 412, 413, and 414. For instance, a first comparison 412 may be between the second baseline date file 406 and the transient parameter data file 410. The first comparison 412 may help identify differences which may have been introduced by the event identified in the event supplementary information 402. A second comparison 414 may provide a longer historical view between the first baseline data file 404 and the transient parameter data file 410. A third comparison 414 may be between the transient parameter data file 410 and the fourth baseline data file 411. The third comparison 414 may enable identification of a difference between parameters at a time when the technical issue was present and another time following the technical issue. Any combination of the comparisons 412-414 may be performed to identify the cause of the technical issue.

In some implementations, one or more of the comparisons 412-414 may be based on a data correlation operation. For instance, in some embodiments, the baseline data files 404, 406, 408, and 411 may be processed to generate derivative files such as numeric vectors. A similarity score between two or more of the baseline data files 404, 406, 408, and 411 may be calculated according to a cosine similarity between the vectors. Additionally, the similarity score may be correlated to a time change between the compared snapshots.

FIG. 4B includes a second set of data files 416. The second set of data files 416 includes first user device data files 401A and second user device data files 401B. The first user device data files 401A may be generated by interrogating a first user device such as the first user device 106A. The second user device data files 401B may be generated by interrogating a second user device such as the second user device 106B, which is similar to the first user device. The first user device data files 401A includes the first baseline data file 404, the second baseline data file 406, the third baseline data file 408, and the transient parameter data file 410 described with reference to FIG. 4B.

The second user device data files 401B includes a first baseline data file 432, a second baseline data file 434, and a third baseline data file 436. Each of the baseline data files 432, 434, and 436 are based on interrogations of the second user device outside times of a technical issue being experienced at the first user device.

With combined reference to FIGS. 3A and 4B, the second set of data files 416 may be stored on the data storage 109 or locally on the user device 106. The compare module 312 may enable visibility to the second set of data files 416 by the IT analyst device 104. Additionally, the compare module 312 may enable one or both of comparisons 440 and 444. For instance, a first comparison 440 may be between the third baseline date file 436 and the transient parameter data file 410. The first comparison 440 may help identify differences between the first user device at the time of the technical issue and a similar user device that is not experiencing the technical issue. A second comparison 444 may provide a longer historical view between the first baseline data file 432 and the transient parameter data file 410. The second comparison may allow a comparison of parameters over a longer period of time to see changes over that time period. In some implementations, one or more of the comparisons 440-444 may be based on a data correlation operation such as the cosine similarity described above. Any combination of the comparisons 440 and 444 as well as comparisons 412-414 of FIG. 4A may be performed to identify the cause of the technical issue.

FIG. 5 is a section of an example comparison file 500. The comparison file 500 includes portions of two azure release pipeline files, which are referenced by "---a/deployment/live/azure-pipelines.yml" and "+++b/deployment/live/azure-piplines.yml" in the comparison file 500. The comparison file 500 are provided in this disclosure to show how a comparison is done in YAML files. The information and software code in the comparison file 500 does not necessarily represent computing parameters compared in embodiments of the present disclosure.

The comparison file 500 may separate and present portions of the data files to enable review and comparison. For instance, in FIG. 5, the comparison file 500 includes portions 502 and 506 of a first data file (---a/deployment/live/azure-piplines.yml). The portions 502 and 506 are compared to portions 504 and 508, respectively of the second data file (+++b/deployment/live/azure-piplines.yml).

In particular, a first portion 502 of the first data file is compared with a first portion 504 of the second data file. The portions 502 and 504 separate each of the code sections to enable inspection and review for differences. Similarly, a second portion 506 of the first data file is separated and presented near a second portion 508 of the second data file to enable comparison.

FIGS. 6A-6I are block diagrams of example screenshots 600A-600I that may be implemented in a remote computing device diagnosis process such as the processes 200, 300A, and 300B described elsewhere in the present disclosure. The screenshots 600A-600I represent one example set of screenshots that may be implanted at a computing system such as the incident management system 102, the provider device 104, the user device 106, or some combination thereof. In other embodiments, other screenshots may be used.

Each of the screenshots 600A-600I show a web page including a user interface that may be accessible to an individual operating a computing system such as a user (e.g., 116), an IT support provider (e.g., 114), a systems manager, or another individual or entity implementing one or more processes described in the present disclosure. The web page depicted in the screenshots 600A-600I may be incorporated in a software application or may be hosted in a browser interface. In the screenshots 600A-600I, the data files (e.g., the baseline data files 209 and the transient parameter data files 362) are referred to as images.

Figure 6A:
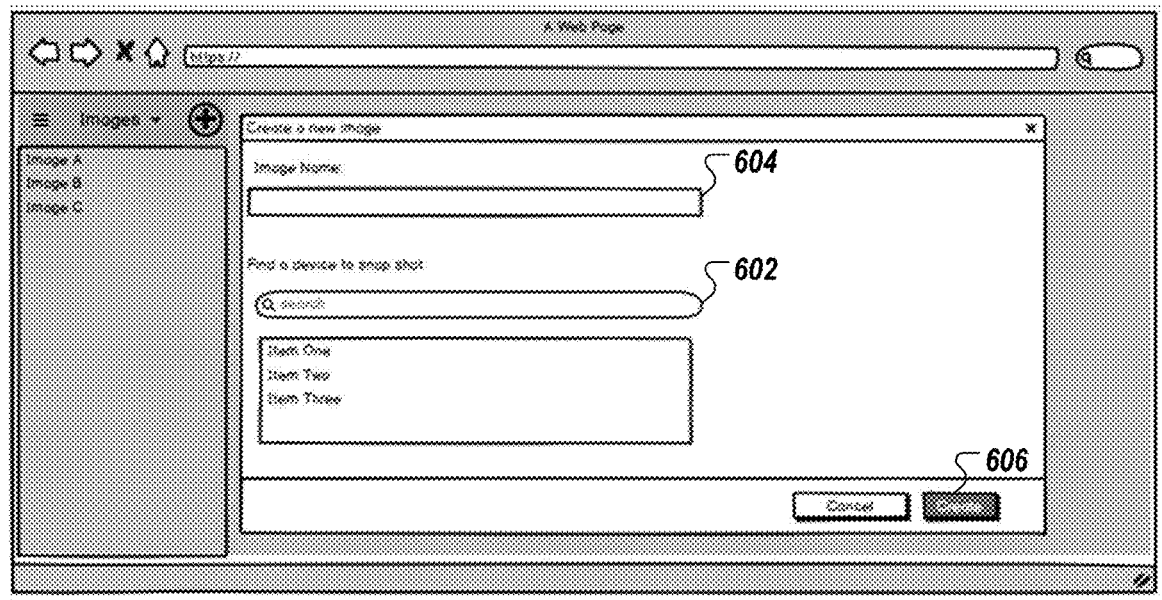
FIGS. 6A-6I are block diagrams of example screenshots that may be implemented in the baseline process of FIG. 2 and the transient processes of FIGS. 3A and 3B.
Figure 6B:
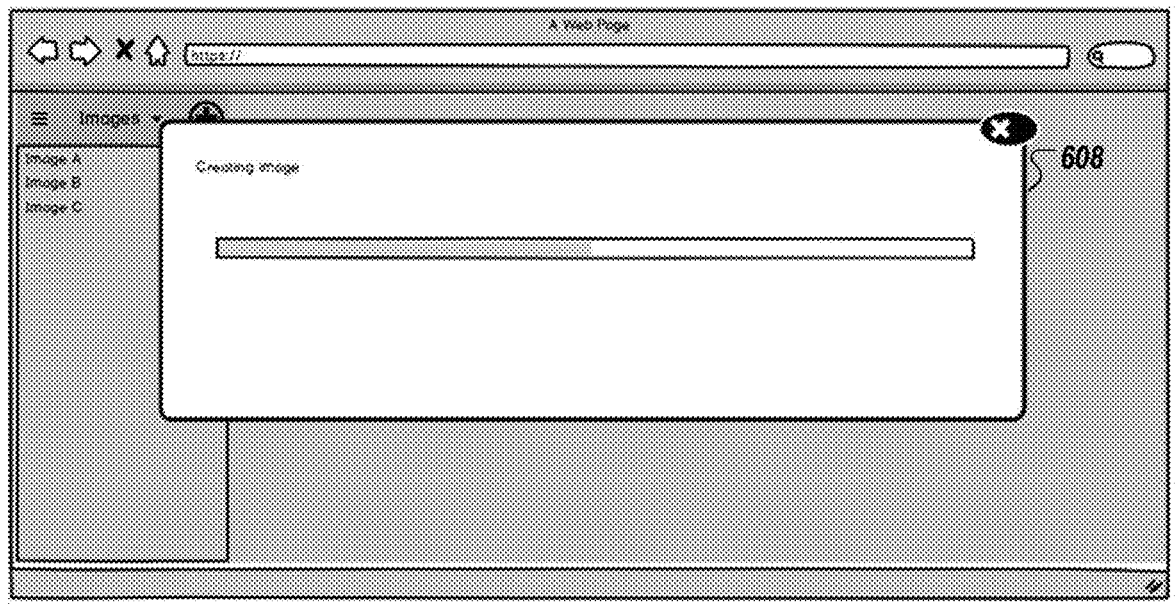

A function or an operation performed at each of the screenshots 600A-600I is described below. A first screen shot 600A is depicted in FIG. 6A. The first screenshot 600A shows a process in which a new image or data file is created. The first screenshot 600A include a first icon 602 that enable selection of a device (e.g., one of the user devices 106) to interrogate. Additionally, the first screenshot 600A includes a second icon 604 that enables an operator to name the data file or image. Selection of a create icon 606 generates the interrogation signal that interfaces with device systems to pull or access parameters. A second screenshot 600B of FIG. 6B depicts a progress bar 608 that is completed as the parameters are pulled from a device and recorded in a data file.

Figure 6C:
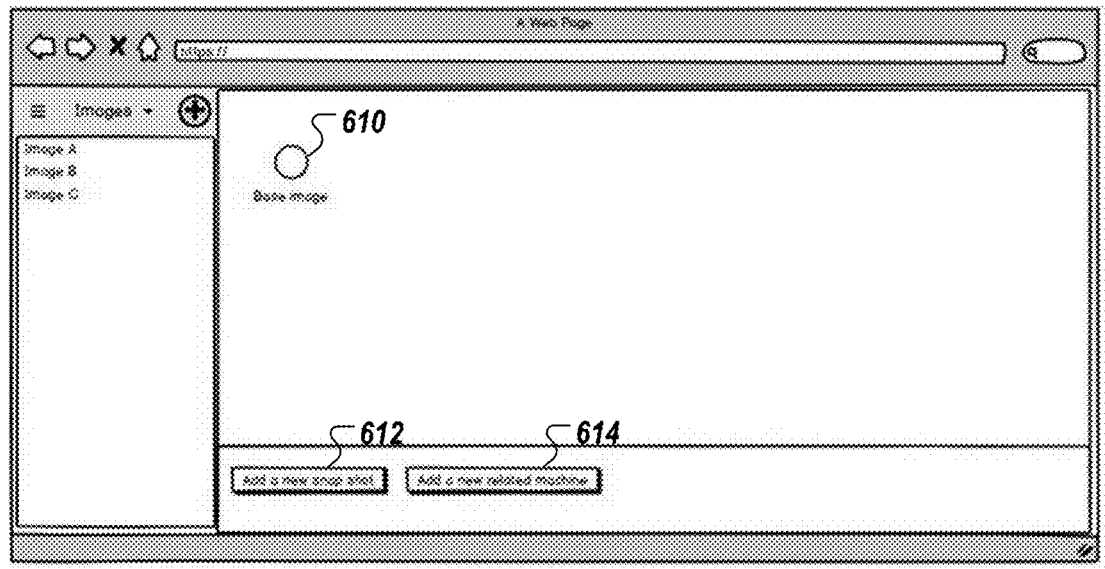

A third screenshot 600C of FIG. 6C depicts a base image 610, which may be similar to and/or correspond to a baseline data file (e.g., 209) described elsewhere in the present disclosure. From the third screenshot 600C, an operator may create a new snapshot of the current device by selecting a "add a new snapshot" icon 612. An operator may create a snapshot of another device by selecting a "add a new related machine" icon 614.

Figure 6D:
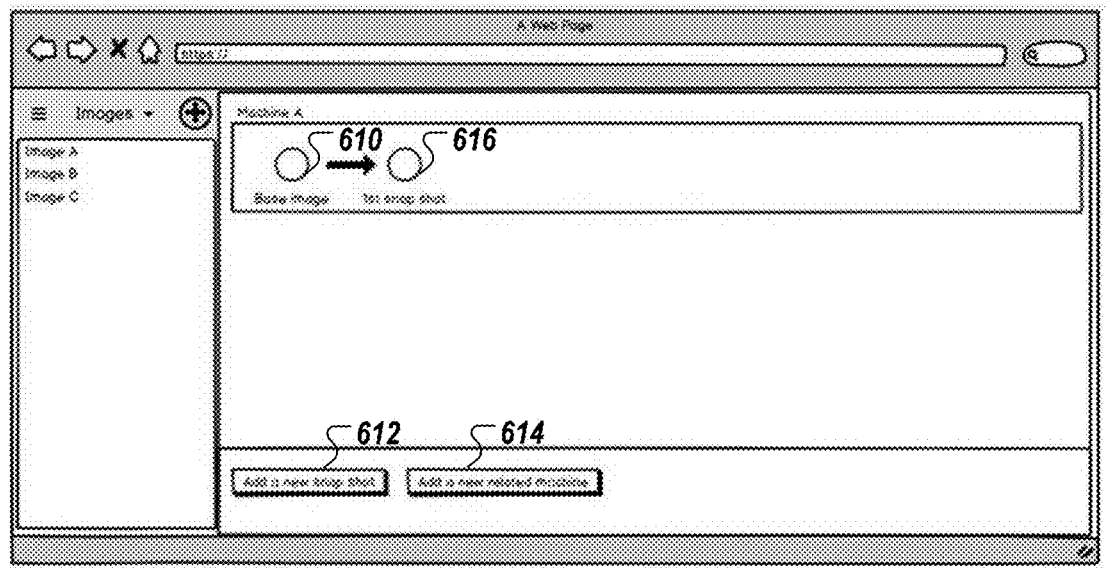

A fourth screenshot 600D of FIG. 6D depicts icons of the base image 610 and a first snapshot image 616 for the first device (machine A). The icon for the first snapshot image 616 may be created through selection of the "add a new snapshot" icon 612.

Figure 6E:
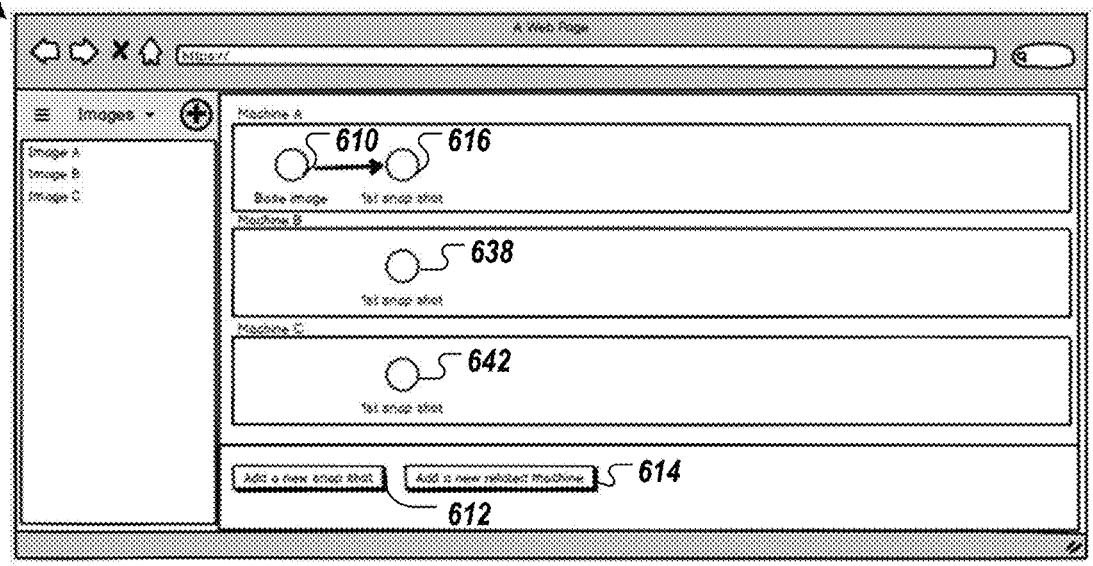

A fifth screenshot 600E of FIG. 6E depicts icons for the base image 610 and the first snapshot image 616 for the first device (machine A). In addition, the fifth screenshot 600E depicts icons for a first snapshot of a second device (machine B) 638 and a first snapshot of a third device (machine C) 642. The icons for the first snapshot of the second device 638 and the first snapshot of the third device 642 may be created through selection of the "add a new related machine" icon 614.

Figure 6F:
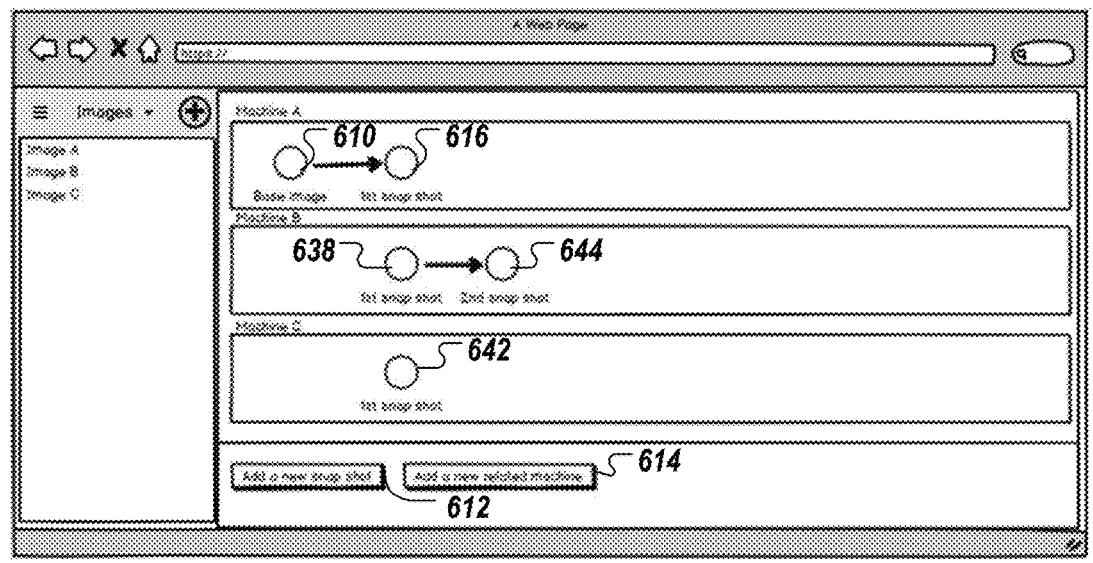
Figure 6G:
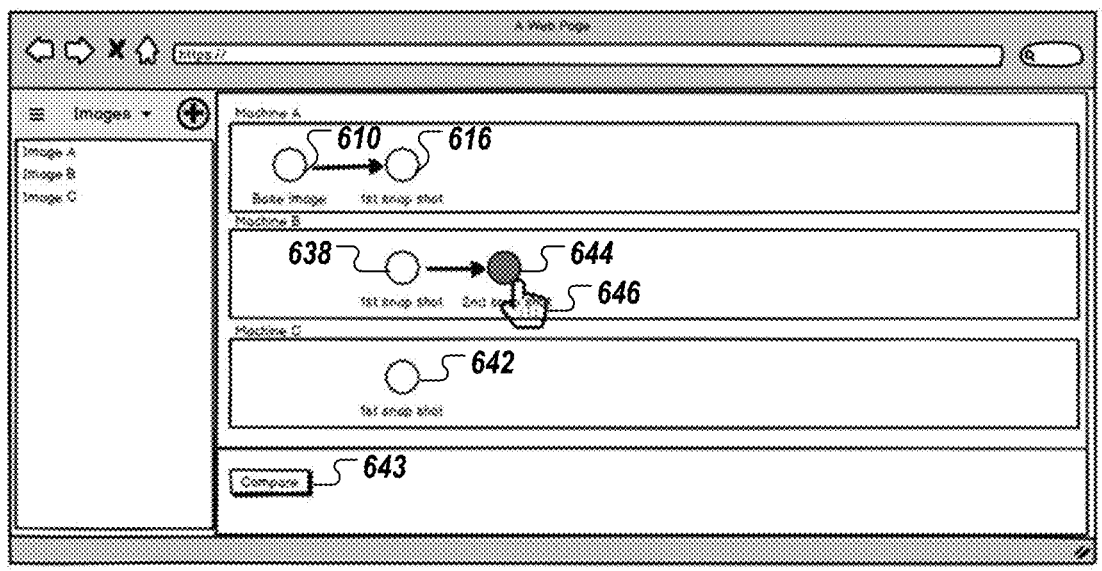

A sixth screenshot 600F of FIG. 6F depicts the icons of the fifth screenshot 600E described above. In addition, the sixth screenshot 600F may include an icon for a second snapshot for the second device (machine B) 644. The icons for the second snapshot of the second device 644 may be created through selection of the "add a new snapshot" icon 612. A seventh screenshot 600G of FIG. 6G may be indicative of a first step in a comparison between snapshots of data files. In the seventh screenshot 600G, a curser 646 is depicted selecting the second snapshot of the second device 644. The sixth screenshot 600F also includes a compare icon 643. Selection of the compare icon 643 initiate access the snapshots or data files and comparing the snapshots or data files.

Figure 6H:
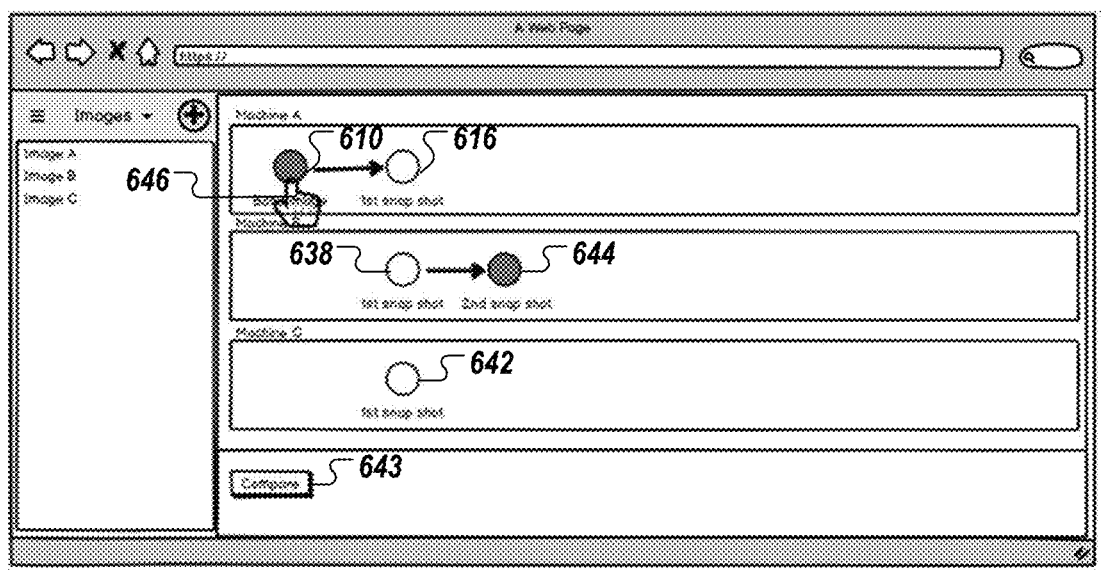
Figure 6I:
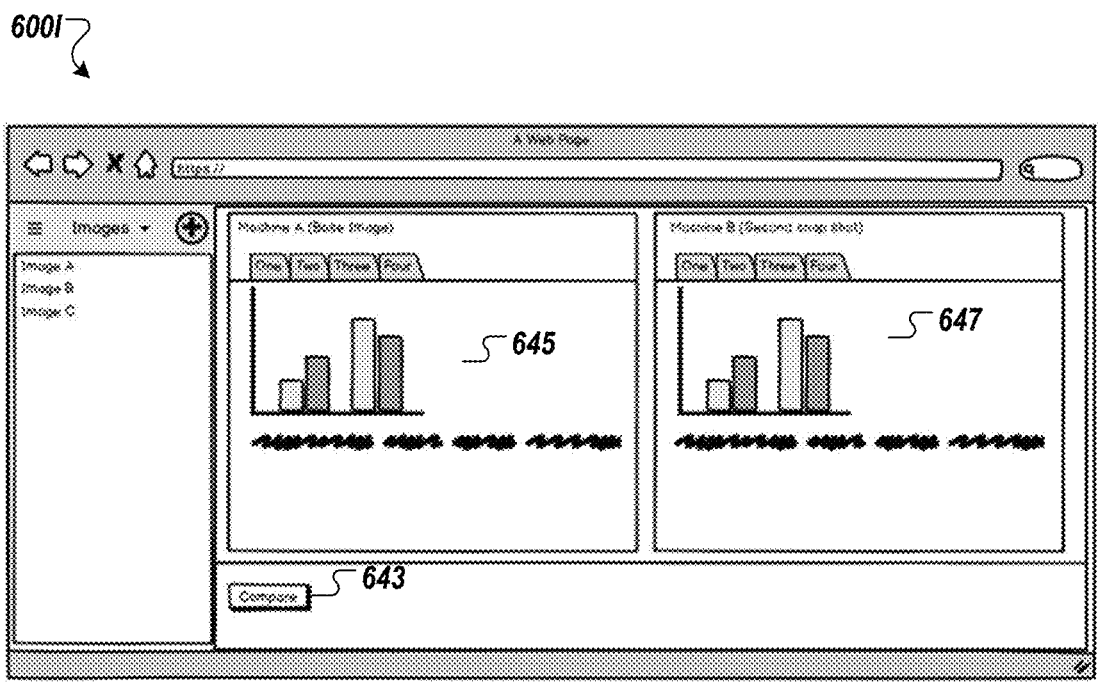

An eighth screenshot 600H of FIG. 6H depicts another step in a compare operations. In the eighth screenshot 600H, the curser 646 is shown selecting the icon for the base image 610 for the first device (machine A). Selection of the compare icon 643 performs the comparison. A ninth screenshot 600I of FIG. 6I depicts example results 645 and 647 of the comparison.

The screenshots 600A-600I depict an example of one or more operations and processes described herein. In other embodiments, one or more operations of functions described with reference to the screenshots 600A-600I may be implemented automatically without action by an operator, may be automatically triggered by a proceeding operation, etc.

Figure 7:
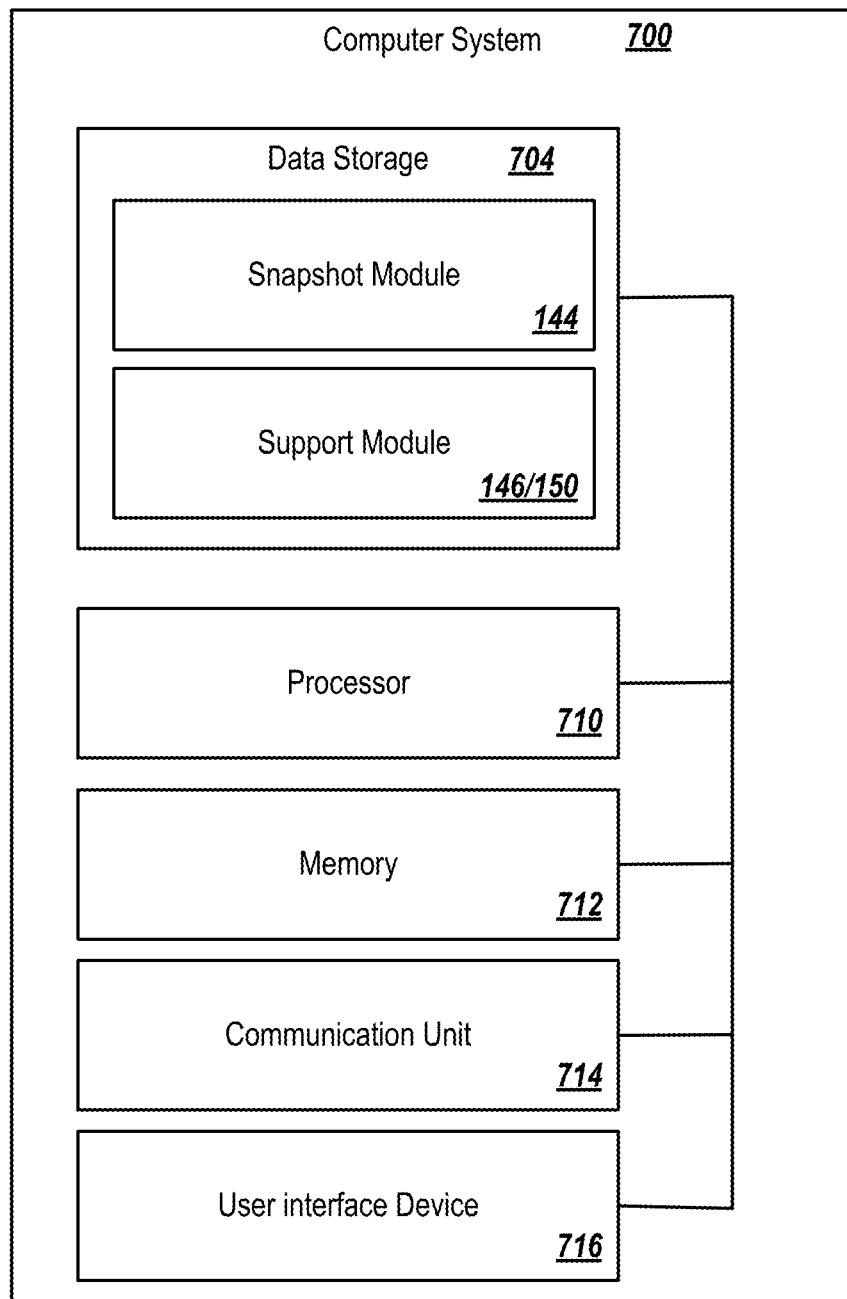
FIG. 7 illustrates an example computing system configured for remote computing device diagnosis based on incident-responsive, computing system snapshot generation.

FIG. 7 illustrates an example computing system 700 configured for remote computing device diagnosis according to at least one embodiment of the present disclosure. The computing system 700 may be implemented in the operating environment 100 of FIG. 1, for instance. Examples of the computing system 700 may include the incident management system 102, the provider device 104, the user device 106, or some combination thereof. The computing system 700 may include one or more processors 710, a memory 712, a communication unit 714, a user interface device 716, and a data storage 704 that includes the snapshot module 144 and the support modules 146/150 (collectively, modules 144/146/150).

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computing system 700 and to present the communication to the processor 710 or to send a communication from the processor 710 to another device or network (e.g., 108 of FIG. 1).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The modules 144/146/150 may include program instructions stored in the data storage 704. The processor 710 may be configured to load the modules 144/146/150 into the memory 712 and execute the modules 144/146/150. Alternatively, the processor 710 may execute the modules 144/146/150 line-by-line from the data storage 704 without loading them into the memory 712. When executing the modules 144/146/150, the processor 710 may be configured to perform one or more processes or operations described elsewhere in this disclosure.

Modifications, additions, or omissions may be made to the computing system 700 without departing from the scope of the present disclosure. For example, in some embodiments, the computing system 700 may not include the user interface device 716. In some embodiments, the different components of the computing system 700 may be physically separate and may be communicatively coupled via any suitable mechanism. For example, the data storage 704 may be part of a storage device that is separate from a device, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
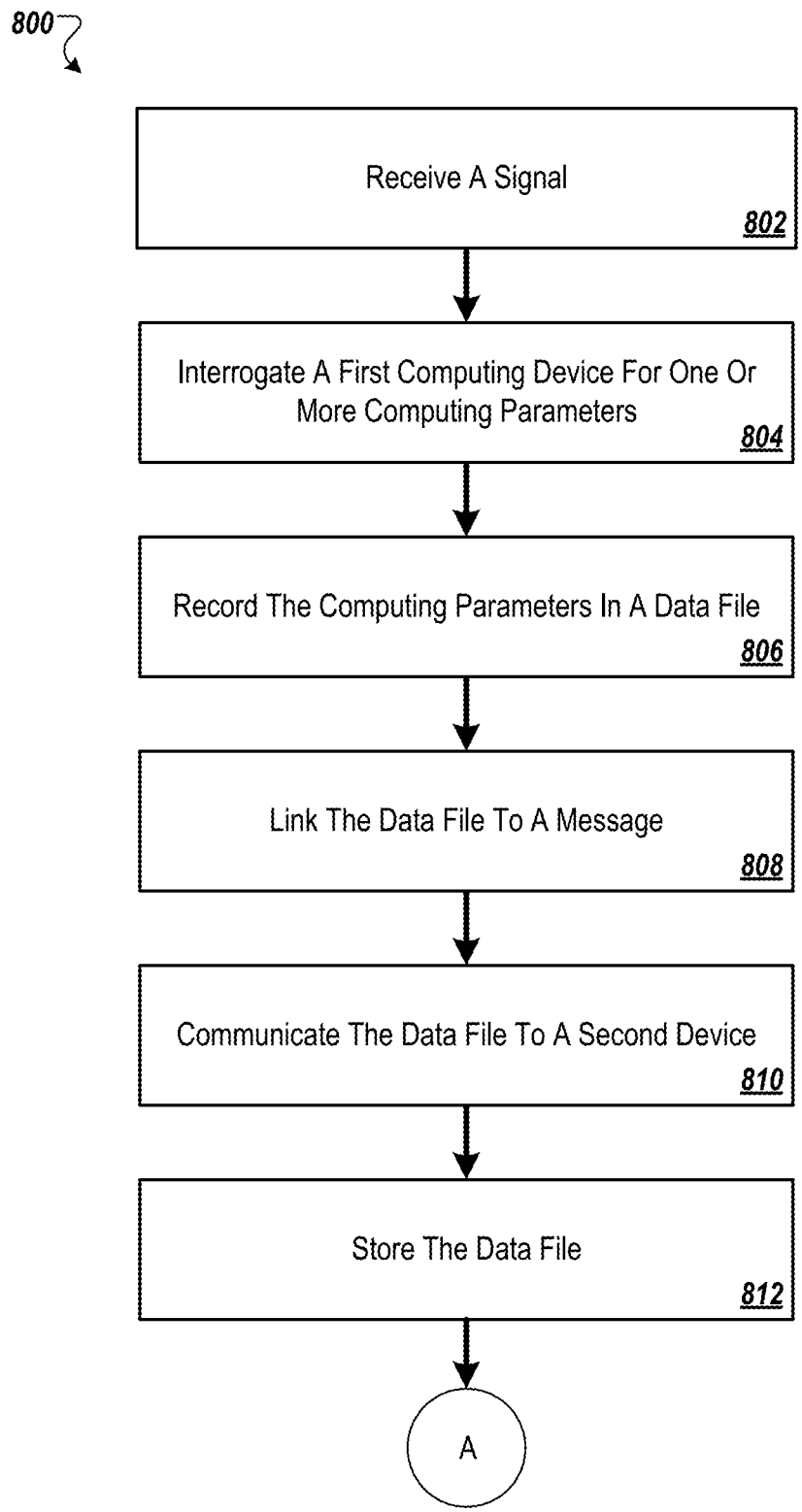
FIGS. 8A and 8B are a flowchart of an example method of remote computing device diagnosis based on incident-responsive, computing system snapshot generation.
Figure 8B:
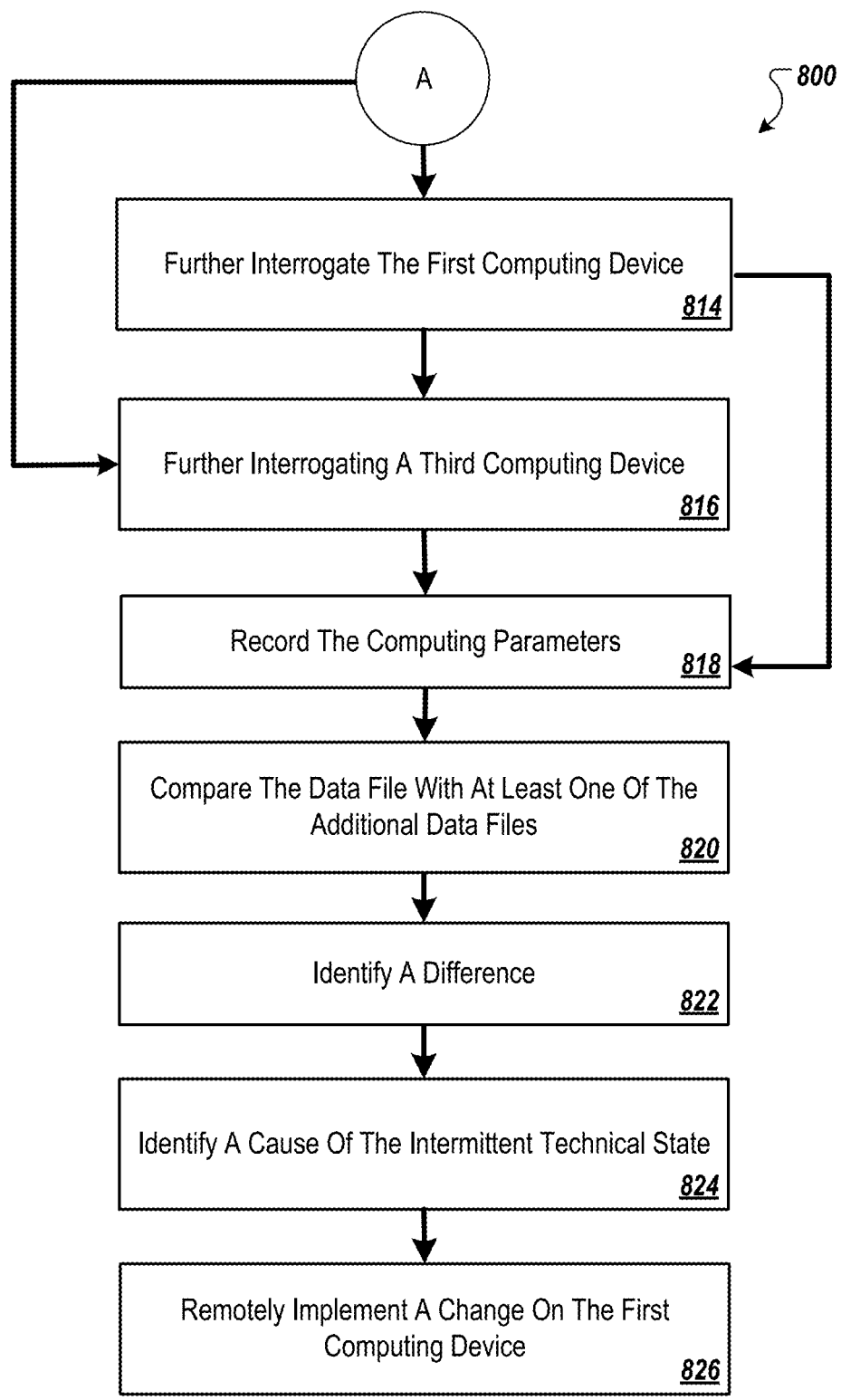

FIGS. 8A and 8B are a flow chart of an example method 800 of remote computing device diagnosis, according to at least one embodiment described in the present disclosure. As described elsewhere in the present disclosure, the method 800 may involve or may be based on incident-responsive, computing system snapshot generation. The method 800 may be performed in an incident management system or another suitable environment such as the operating environment 100. The method 800 may be at least partially implemented in an information technology service management (ITSM) system or by an incident management device. The ITSM system may be included in a cloud-based networked system, an on-premises system, a managed network, managed subnetwork, or another suitable network computing environment.

Referring to FIG. 8A, the method 800 may begin at block 802, in which a signal is received. The signal may be indicative of an intermittent technical state of a first computing device. In some embodiments, the signal may be triggered responsive to input by a user. For instance, the input may be received response to selection of an icon by the user on the first computing device. The icon may include an IT ticket icon in some implementations. Additionally or alternatively, the signal indicative of the intermittent technical state may be triggered responsive to a specific event on the first computing device. For example, the signal may be triggered by a fault or a failure of the first computing device such as an unexpected application closure, a frozen application, a stop error, or a similar error technical state.

At block 804, the first computing device may be interrogated. For instance, the first computing device may be interrogated immediately responsive to the signal. The interrogation may be automatic and without delay to capture computing parameters at the first computing device when or substantially when the signal is communicated. The first computing device may be interrogated for a set of computing parameters, which may be related to the intermittent technical state of the first computing device. The computing parameters may include at least one transient parameter that is present at a first time at which the intermittent technical state exists on the first computing device and not present a second time following the first time. The interrogation may be configured to sample or record the computing parameters over a period of time.

In some embodiments, the parameters and the transient parameter are computing parameters indicate of the state of the first computing device. Some example parameters may include a current central processing unit (CPU) use, a process currently running on the first computing device, a service loaded on the first computing device, current memory use, an error message, a security threat, current network traffic, another suitable parameter related to the intermittent technical state, or some combination thereof. In some embodiments, interrogation of the first computing device includes communicating a MQ telemetry transport (MQTT) message to the first computing device.

At block 806, the computing parameters may be recorded in a data file. The data file may be formatted according to a human-readable data-serialization language and/or a flat file format. For instance, the data file maybe formatted according to YAML or JSON. YAML embeds information in the data file using white spaces and tabs. The data file represents a "snapshot" or real time image of the parameters at the time the signal is received.

In some embodiments, one or both of interrogation of the first computing device and the recordation of the data file may be implemented using real time sensors. As used in this disclosure, the real time sensors include computing operations that are implemented to obtain the values for the parameters in real time. The real time sensors include a set of non-transitory computing instructions. The set of non-transitory computing instructions may be stored locally at the first computing device or may be remotely managed by an incident management device such as the incident management device 102. The real time sensors may be utilized to generate a protocol, a script, a workflow, etc. that determines when an interrogation occurs, which computing parameters are sampled, a period of time that the computing parameters are sampled or combinations thereof.

At block 808, the data file may be linked to a message. The message may describe or otherwise include information regarding the intermittent technical state. The message may be linked to the data file throughout a network service system, which may include an incident management device such as the incident management device 102. At block 810, the data file may be communicated to a second computing device. The second device may be associated with an IT support provider. The data file may be communicated along with the message. Based on the data file and the message, the IT support provider may attempt to diagnose the technical issue on the first computer device. At block 812, the data file and the message may be stored. The data file and the message may be stored in an on-premises data store of a computing devices such as the first computing device and/or on cloud data store.

Referring to FIG. 8B, from block 812, the method 800 may proceed to one or both of blocks 814 and 816. At block 814, the first computing device may be further interrogated. The first computing device may be interrogated for the computing parameters at one or more times outside receipt of the signal. At block 816, a third computing device may be interrogated for the computing parameters. The third computing device may be similarly configured to the first computing device. For example, the third computing device may include one or more similar software applications, hardware configurations, functionalities, or combinations thereof. In particular, the third computing device and the first computing device may include the similar software programs, may include the similar permissions, may be similar or identical machines, may include the similar hardware, may be included on a similar spot or location on a network, may be issued to users with similar roles, and the like.

Blocks 814 and 816 may be performed according to a schedule or protocol. For instance, blocks 814 and/or 816 may be performed prior to one or more of blocks 802, 804, 806, 808, 810, and 812. Additionally, blocks 814 and 816 may performed following blocks 802, 804, 806, 808, 810, and 812. Thus, the additional data blocks may be representative of the first or third computing devices, prior to and following the intermittent technical state of the first computing device and the signal indicating the intermittent technical state.

In some embodiments, one or more the additional data files may be stored using distributed version control system such as GIT or another distributed version control system. Additionally, the additional data files may be locally stored on an agent loaded on the first computing device or third computing device or may be communicated to a cloud network and stored remotely from the first computing device.

At block 818, the computing parameters accessed at the first computing device and/or the third computing device may be recorded. The computing parameters may be recorded in data files such as baseline data files or additional data files, which may be representative of parameters during normal operation or outside of times in which the first computer device is experiencing a technical issue. The transient parameter data file may be formatted according to the human-readable data-serialization language and the flat file format.

At block 820, the data file and one or more of the additional data files may be compared. For example, the data file generated responsive to the signal may be compared to a first additional data file generated from parameters on the first computing device during normal operation. Additionally or alternatively, the data file may be compared to a second additional data file generated from parameters on the third computing device.

The comparison may be based on a similarity score between two or more data files. The similarity score may be calculated by converting the data files into numeric vectors and calculating a cosine similarity between the vectors. Additionally, the similarity score may be correlated to a time change between the compared snapshots. For example, a result of the comparison may be a percentage change over a time (e.g., 78% similarity between a baseline and data file dated one day before).

At block 822, a difference may be identified. The difference may be a variation between at least one parameter represented in the data files. The difference may be identified based on the comparison of block 820. The difference may be related to a cause of the intermittent technical state. For instance, a change in CPU usage identified through a comparison between the transient parameter data file and the baseline data file may be indicative an acute hardware malfunction related to the CPU. As another example, the difference may be an unusually high memory allocation to a particular application at a particular time. The high memory allocation may be indicative of a process that is interfering with an add-in.

At block 824, a cause of the intermittent technical state may be identified. The cause may be identifying at least partially based on the difference between the data file and an additional data file identified in block 822.

At block 826, a change maybe remotely implemented on the first computing device. The change may be configured to mitigate the cause of the intermittent technical state. For example, the change may be configured to install or re-install an application, change a setting on the first computing device, remove a security threat, change or modify a permission, another change that modifies the state of the first computing device, or some combination thereof. In some embodiments, the change may include instructions which may be at least partially executed by a user of the first computing device.

Figure 9A:
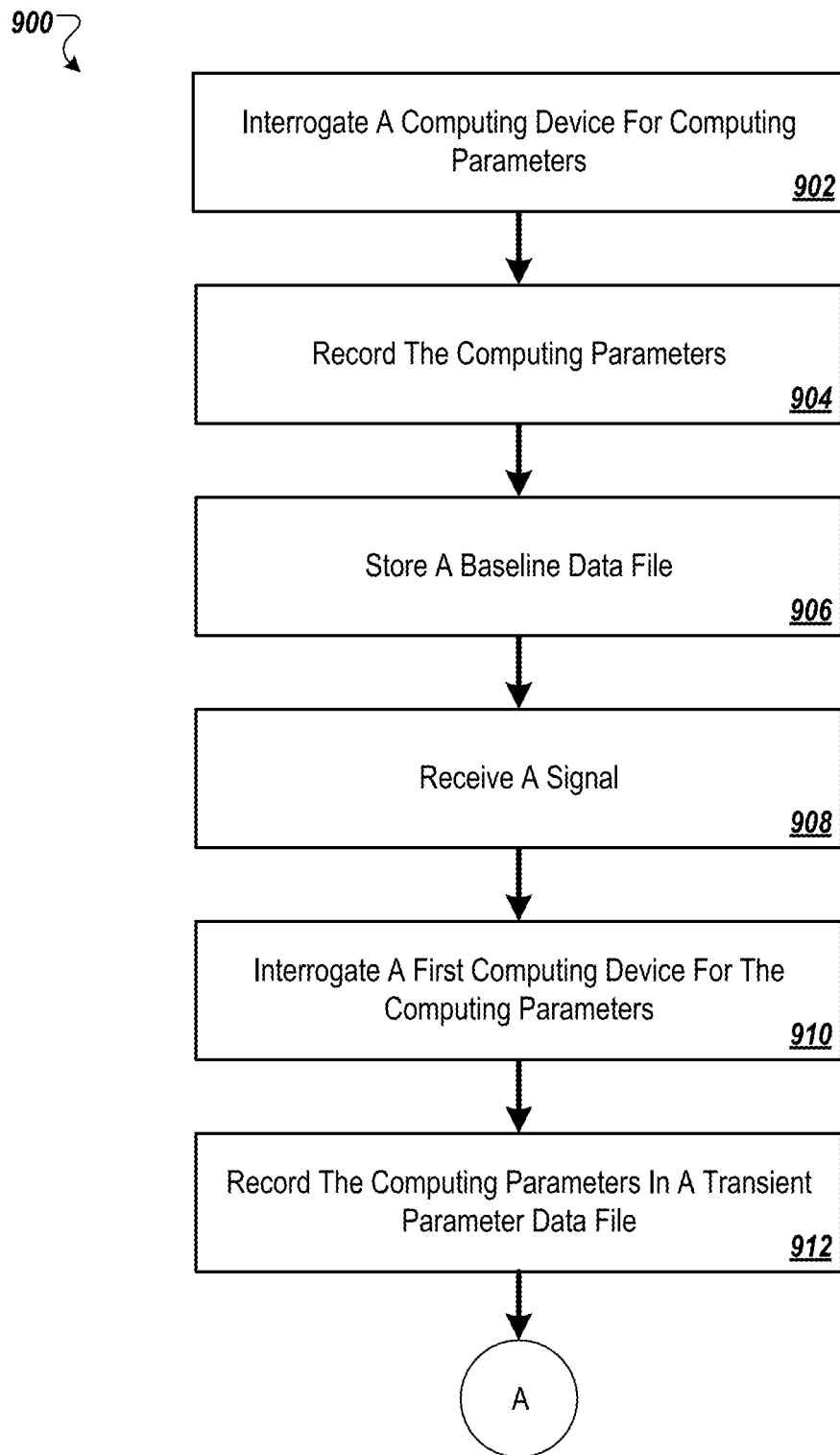
FIGS. 9A and 9B are a flowchart of another example method of remote computing device diagnosis based on incident-responsive, computing system snapshot generation, all according to at least one embodiment described in the present disclosure.
Figure 9B:
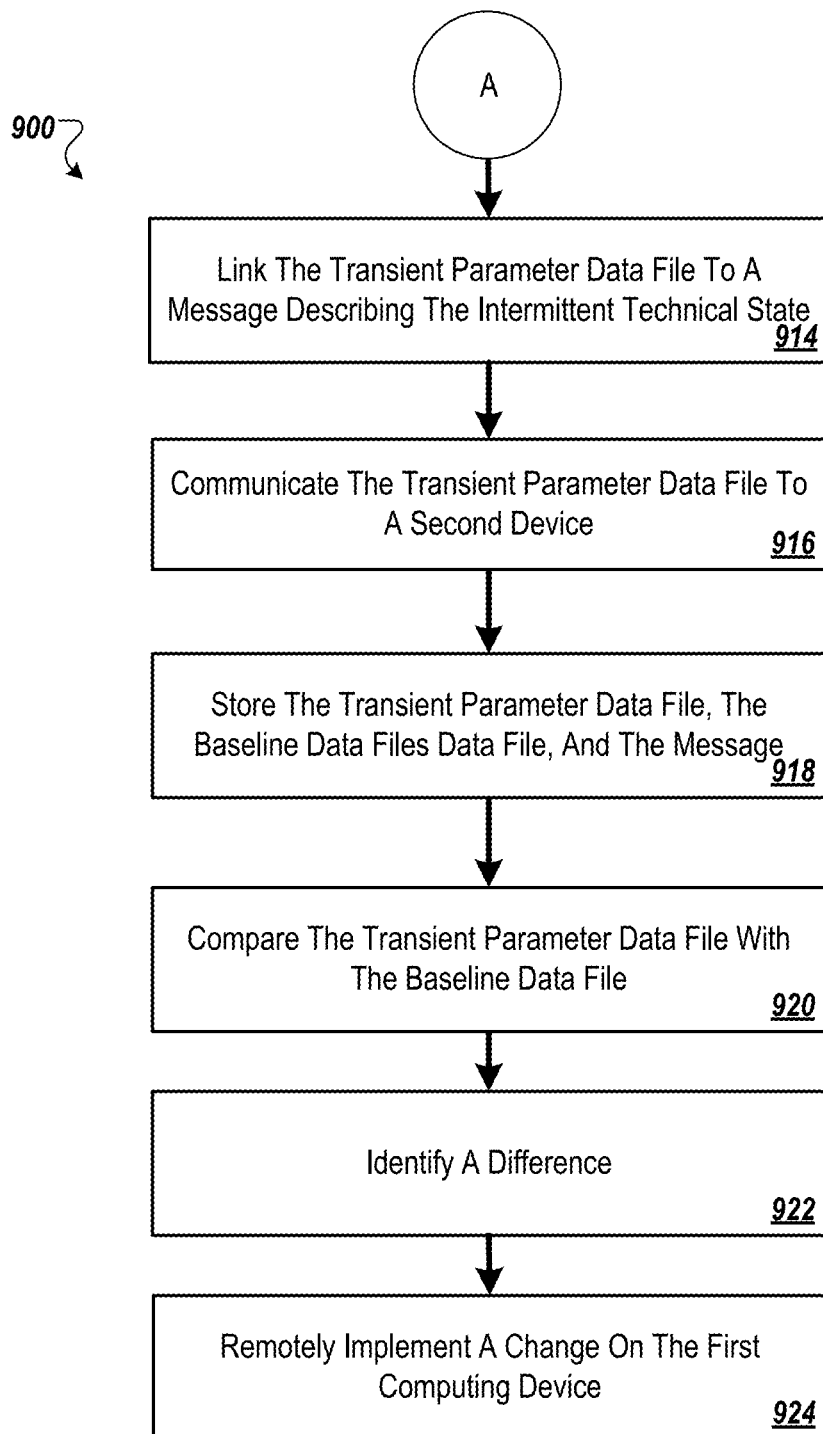

FIGS. 9A and 9B are a flow chart of an example method 900 of remote computing device diagnosis, according to at least one embodiment described in the present disclosure. As described elsewhere in the present disclosure, the method 900 may involve or may be based on incident-responsive, computing system snapshots. The incident-responsive, computing system snapshots and the method 900 may be performed in an incident management system or another suitable environment such as the operating environment 100. The method 900 may be at least partially implemented in an information technology service management (ITSM) system or by an incident management device. The ITSM system may be included in a cloud-based networked system, an on-premises system, a managed network, managed subnetwork, or another suitable network computing environment.

Referring to FIG. 9A, the method 900 may begin at block 902 in which a computing device may be interrogated. The computing device may be interrogated for one or more computing parameters. The computing device subject to the interrogation may include a first computing device and/or a third computing device. The third computing device may be similarly configured to the first computing device. For example, the third computing device may include one or more similar software applications, hardware configurations, functionalities, or combinations thereof. In particular, the third computing device and the first computing device may include the similar software programs, may include the similar permissions, may be similar or identical machines, may include the similar hardware, may be included on a similar spot or location on a network, may be issued to users with similar roles, and the like.

In some embodiments, the interrogation of the computing device may be performed according to a particular schedule. For example, the interrogation may occur every quarter or another suitable period of time, may occur following an update to hardware or software, may occur following technical issues, and the like.

The interrogation may request or access specific parameters related to a computing device. For instance, the parameters may include a current CPU use, a process currently running on the first computing device, a service loaded on the first computing device, current memory use, current network traffic, other computing device parameters, or combinations thereof.

At block 904, the computing parameters may be recorded. For example, the interrogation may pull a set of parameters (e.g., CPU use, running applications, etc.). The set of parameters may be recorded in a baseline data file. The baseline data file may include the set of parameters when the computing device is normally or properly operating. In some embodiments, the baseline data file may be formatted according to a human-readable data-serialization language and/or a flat file format. Such formatting may enable review and comparison of the baseline data file with relatively low resource allocation. For instance, an example human-readable data-serialization language may be YAML or JSON. YAML generates data files that separate information with whitespaces and indents, which may improve reviewability of the data files by the IT support provider.

At block 906, the baseline data file may be stored. The baseline data file may be stored using a distributed version control system such as GIT or another suitable program. At block 908, a signal may be received. The signal may be indicative of an intermittent technical state of the first computing device. For instance, the signal may be indicative of the intermittent technical state, which may be a problem or technical failure of the first computing device. The signal may be triggered responsive to input by a user. The input may be received response to selection of an icon by a user on the first computing device. Additionally or alternatively, the signal may be triggered responsive to a specific event on the first computing device. For example, the signal may be generated and communicated if the first computing system crashes or unexpectedly stops working.

At block 910, the first computing device may be interrogated. The first computing device may be interrogated immediately responsive to the signal or in real time. The first computing device may be interrogated for one or more computing parameters similar or identical to the computing parameters requested in blocks 902. At least one of the computing parameters may be related to the intermittent technical state of the first computing device. Additionally, at least one of the computing parameters may include at least one transient parameter that is present only while the intermittent technical state exists on the first computing device. In some embodiments, interrogation of the first computing device may include communication of a MQ telemetry transport (MQTT) message to the first computing device.

At block 912, the computing parameters accessed at the first computing device may be recorded. The computing parameters may be recorded in a transient parameter data file. The transient parameter data file may be formatted according to the human-readable data-serialization language and the flat file format.

Referring to FIG. 9B, at block 914, a transient parameter data file may be linked to a message. The message may describe the intermittent technical state experience at the first computing device. The message may be based on a support ticket or another set of information that is generated or based on the technical state of the first computing device. The transient parameter data file may be linked to the message throughout a network service system.

At block 916, the transient parameter data file may be communicated to a second computing device. The second computing device may be associated with an IT support provider. The transient parameter data file may be communicated to the second computing device along with the message.

At block 918, the transient parameter data file, the baseline data files data file, the message, other relevant information, or combinations thereof may be stored. In some embodiments, the data files and/or the message may be stored in an on-premises data store of the first computing device and/or on cloud data store. For instance, the data files may be stored locally at the first computing device. Additionally or alternatively, the data files may be communicated via a communication network to a remote server where the data files are stored. For example, in some embodiments, one or both of the baseline data file(s) and the transient parameter data file may be locally stored on an agent loaded on the first computing device. Additionally or alternatively, one or both of the baseline data file(s) and the transient parameter data file may be communicated to a cloud network and stored remotely from the first computing device.

At block 920, the transient parameter data file and one or more of the baseline data files may be compared. For example, the transient parameter data file may be compared to a first baseline data file generated from parameters on the first computing device. Additionally, the transient parameter data file may be compared to a second baseline data file generated from parameters on the third computing devices, which is similar to the first computing device. The comparison may be based on a similarity score between two or more data files and may be correlated to a time change between the compared snapshots.

At block 922, a difference may be identified. The difference may be a variation between at least one parameter represented in the data files. The difference may be identified based on the comparison. The difference may be related to a cause of the intermittent technical state. For instance, a change in CPU usage identified through a comparison between the transient parameter data file and the baseline data file may be indicative an acute hardware malfunction related to the CPU. As another example, the difference may be an unusually high memory allocation to a particular application at a particular time. The high memory allocation may be indicative of a process that is interfering with an add-in.

At block 924, at least one change to the first computing device may be remotely implemented. The at least one change to the first computing device may mitigate the cause of the intermittent technical state. For example, the change may be configured to install or re-install an application, change a setting on the first computing device, remove a security threat, change or modify a permission, another change that modifies the state of the first computing device, or some combination thereof.

In some embodiments, interrogation and/or record of parameters may be implemented through execution of real time sensors. Real time sensors may be configured to pull specific data and information including parameters from one or more computing devices and connections therebetween. The real time sensors may include a set of non-transitory computing instructions. The real time sensors may be stored locally at the first computing device or may be centrally, remotely managed, and locally implemented.

Although illustrated as discrete blocks, one or more blocks in FIGS. 8A-9B may be divided into additional blocks, combined into fewer blocks, or eliminated, depending on the desired implementation. The methods 800 and/or 900 may be performed in an operating environment such as the operating environment 100 of FIG. 1. The methods 800 and/or 900 may be performed in some embodiments by the incident management device 102, the support modules 146/150, the snapshot module 144 or some combination thereof described with reference to FIGS. 1-3. In some embodiments, the incident management device 102, the provider device 104, or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system, the provider devices 104, the incident management device 102, the user device 106, or some combination thereof to perform or control performance of the methods 800 and/or 900.

Additionally or alternatively, the incident management device 102 or the provider device 104 may include the processor 710 described elsewhere in this disclosure that is configured to execute computer instructions to cause the incident management device 102, the provider devices 104, the user device 106, or one or more other computing systems to perform or control performance of the methods 800 and/or 900.

Further, modifications, additions, or omissions may be made to the methods 800 and 900 without departing from the scope of the present disclosure. For example, the operations of methods 800 and/or 900 may be implemented in differing order. Furthermore, the outlined operations and actions are only provided as examples, and some of the operations and actions may be optional, combined into fewer operations and actions, or expanded into additional operations and actions without detracting from the disclosed embodiments.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

The various features illustrated in the drawings may not be drawn to scale. The illustrations presented in the present disclosure are not meant to be actual views of any particular apparatus (e.g., device, system, etc.) or method, but are representations employed to describe embodiments of the disclosure. Accordingly, the dimensions of the features may be expanded or reduced for clarity. In addition, some of the drawings may be simplified for clarity. Thus, the drawings may not depict all of the components of a given apparatus (e.g., device) or all operations of a particular method.

Terms used in the present disclosure and the claims (e.g., bodies of the appended claims) are intended as "open" terms (e.g., the term "including" should be interpreted as "including, but not limited to," the term "having" should be interpreted as "having at least," the term "includes" should be interpreted as "includes, but is not limited to," among others). Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in instances in which a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Further, any disjunctive word or phrase presenting two or more alternative terms should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

The terms "first," "second," "third," etc., are not necessarily used to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present inventions have been described in detail, it should be understood that the various changes, substitutions, and alterations could be made hereto without departing from the scope of the invention.

What is claimed is:

1. A method of remote computing device diagnosis and mitigation, the method comprising:
   interrogating a first computing device for a plurality of computing parameters at a first time;
   recording the plurality of computing parameters for the first computing device at the first time in a first baseline data file;
   at a second time that is different from the first time, receiving a signal indicative of an intermittent technical state of a second computing device, wherein the first computing device is similarly configured to the second computing device;
   immediately responsive to the signal, interrogating the second computing device for the plurality of computing parameters;
   recording the plurality of computing parameters for the second computing device in a first data file;
   comparing the first data file with the first baseline data file;
   based on the comparison, identifying a difference in at least one parameter of the plurality of computing parameters between the first data file and the first baseline data file, the difference being indicative of a cause of the intermittent technical state; and
   remotely implementing at least one change on the second computing device to mitigate the cause of the intermittent technical state.

2. The method of claim 1, wherein:
   the signal indicative of the intermittent technical state is triggered responsive to a selection of an icon by a user on the second computing device; and
   icon includes an information technology (IT) ticket icon.

3. The method of claim 1, wherein the signal indicative of the intermittent technical state is triggered responsive to a specific event on the second computing device.

4. The method of claim 3, wherein the specific event includes:
   a fault;
   a failure of the second computing device;
   an unexpected application closure;
   a frozen application; or
   a stop error.

5. The method of claim 1, wherein the interrogating the first computing device is performed according to a particular schedule.

6. The method of claim 1, further comprising:
   receiving with the signal, a message describing the intermittent technical state in a network service system;
   linking the first data file to the message; and
   communicating the message to a third device along with the first data file.

7. The method of claim 1, wherein:
the interrogating the second computing device is implemented through execution of one or more real time sensors that include a set of non-transitory computing instructions stored locally at the second computing device; or
the interrogating the first computing device includes communicating a message queuing telemetry transport (MATT) message to the the first computing device.

8. The method of claim 1, wherein:
the first data file is formatted according to a human-readable data-serialization language and a flat file format; and
the human-readable data-serialization language is YAML or JSON.

9. The method of claim 1, wherein the plurality of computing parameters includes one or more or a combination of a current central processing unit (CPU) use, a process currently running on the second computing device, a service loaded on the second computing device, current memory use, and current network traffic.

10. One or more non-transitory computer-readable media storing one or more programs that are configured, in response to execution by one or more processors, to cause a system to execute or control execution of operations of remote computing device diagnosis and mitigation, the operations comprising:
interrogating a first computing device for a plurality of computing parameters at a first time;
recording the plurality of computing parameters for the first computing device at the first time in a first baseline data file;
at a second time that is different from the first time, receiving a signal indicative of an intermittent technical state of a second computing device, wherein the first computing device is similarly configured to the second computing device;
immediately responsive to the signal, interrogating the second computing device for the plurality of computing parameters;
recording the plurality of computing parameters for the second computing device in a first data file;
comparing the first data file with the first baseline data file;
based on the comparison, identifying a difference in at least one parameter of the plurality of computing parameters between the first data file and the first baseline data file, the difference being indicative of a cause of the intermittent technical state; and
remotely implementing at least one change on the second computing device to mitigate the cause of the intermittent technical state.

11. The one or more non-transitory computer-readable media of claim 10, wherein:
the signal indicative of the intermittent technical state is triggered responsive to a selection of an icon by a user on the second computing device; and
icon includes an information technology (IT) ticket icon.

12. The one or more non-transitory computer-readable media of claim 10, wherein the signal indicative of the intermittent technical state is triggered responsive to a specific event on the second computing device.

13. The one or more non-transitory computer-readable media of claim 12, wherein the specific event includes:
a fault;
a failure of the second computing device;
an unexpected application closure;
a frozen application; or
a stop error.

14. The one or more non-transitory computer-readable media of claim 10, wherein the interrogating the first computing device is performed according to a particular schedule.

15. The one or more non-transitory computer-readable media of claim 10, further comprising:
receiving with the signal, a message describing the intermittent technical state in a network service system;
linking the first data file to the message; and
communicating the message to a third device along with the first data file.

16. The one or more non-transitory computer-readable media of claim 10, wherein:
the interrogating the second computing device is implemented through execution of one or more real time sensors that include a set of non-transitory computing instructions stored locally at the second computing device; or
the interrogating the first computing device includes communicating a message queuing telemetry transport (MATT) message to the the first computing device.

17. The one or more non-transitory computer-readable media of claim 10, wherein:
the first data file is formatted according to a human-readable data-serialization language and a flat file format; and
the human-readable data-serialization language is YAML or JSON.

18. The one or more non-transitory computer-readable media of claim 10, wherein the plurality of computing parameters includes one or more or a combination of a current central processing unit (CPU) use, a process currently running on the second computing device, a service loaded on the second computing device, current memory use, and current network traffic.

* * * * *